United States Patent [19]

Spitler

[11] Patent Number: 5,941,048
[45] Date of Patent: Aug. 24, 1999

[54] APPARATUS AND METHOD OF SEALING AN ENVELOPE IN A DOCUMENT SECURITY APPARATUS

[75] Inventor: Mark E. Spitler, Irvine, Calif.

[73] Assignee: Privatizer Systems, Inc, Dayton, Ohio

[21] Appl. No.: 08/951,438

[22] Filed: Oct. 15, 1997

Related U.S. Application Data

[63] Continuation-in-part of application No. 08/767,114, Dec. 4, 1996, abandoned.

[51] Int. Cl.⁶ ...................................................... B65B 51/10
[52] U.S. Cl. ...................... 53/374.4; 53/374.5; 53/375.4; 156/441.5; 156/582
[58] Field of Search .............................. 53/374.2, 374.4, 53/374.5, 375.4, 450, 550, 551, 451; 493/379, 393, 394, 471; 156/441.5, 442, 582

[56] References Cited

U.S. PATENT DOCUMENTS

| | | | |
|---|---|---|---|
| 3,060,075 | 10/1962 | Kincaid | 156/251 |
| 3,086,577 | 4/1963 | Gimple | 156/495 |
| 3,168,016 | 2/1965 | Kehr | 93/8 |
| 3,900,192 | 8/1975 | Gibson | 271/3.1 |
| 3,901,758 | 8/1975 | Humphries | 156/499 |
| 4,021,288 | 5/1977 | Hannon et al. | 156/499 |
| 4,150,183 | 4/1979 | Reed | 428/42 |
| 4,353,776 | 10/1982 | Giulie et al. | 156/555 |
| 4,455,808 | 6/1984 | Netzhammer | 53/373 |
| 4,500,387 | 2/1985 | Embury | 156/499 |
| 4,527,379 | 7/1985 | Bartzick et al. | 53/589 |
| 4,572,350 | 2/1986 | Besemann | 198/372 |
| 4,589,645 | 5/1986 | Tracy | 271/3.1 |
| 4,608,114 | 8/1986 | Nakao | 156/497 |
| 4,720,321 | 1/1988 | Smith | 156/549 |
| 4,733,856 | 3/1988 | Gunther, Jr. | 270/1.1 |
| 4,750,729 | 6/1988 | Kanoto et al. | 271/162 |
| 4,778,170 | 10/1988 | Hynes | 271/253 |
| 4,783,234 | 11/1988 | Simonton | 156/555 |
| 4,804,428 | 2/1989 | Held | 156/267 |
| 4,896,355 | 1/1990 | Iggulden et al. | 380/54 |

(List continued on next page.)

FOREIGN PATENT DOCUMENTS

| | | | |
|---|---|---|---|
| 64-48767 | 2/1989 | Japan | B65H 27/00 |
| 5-42916 | 2/1993 | Japan | B65B 51/10 |
| WO 93/11948 | 6/1993 | WIPO | B42D 15/00 |

*Primary Examiner*—James F. Coan
*Assistant Examiner*—Gene L. Kim
*Attorney, Agent, or Firm*—Maginot, Addison & Moore

[57] ABSTRACT

A sealing assembly includes a support roller. The sealing assembly also includes a center roller having a sealing ridge attached thereto which operatively contacts the support roller so as to urge a first enclosure sheet into contact with a second enclosure sheet. The sealing assembly further includes a first edge roller which operatively contacts the support roller so as to urge the first enclosure sheet into contact with the second enclosure sheet. The center roller and the first edge roller are rotatably supported on a common axis. The center roller rotates independently of the first edge roller. A method of sealing an envelope in a document security apparatus is also disclosed.

18 Claims, 28 Drawing Sheets

U.S. PATENT DOCUMENTS

| | | | |
|---|---|---|---|
| 4,898,374 | 2/1990 | Vermaat | 271/178 |
| 4,961,302 | 10/1990 | Davis | 53/451 |
| 4,968,063 | 11/1990 | McConville et al. | 283/72 |
| 4,972,655 | 11/1990 | Ogawa | 53/155 |
| 4,979,727 | 12/1990 | Koike et al. | 271/3.1 |
| 5,001,749 | 3/1991 | Iggluden et al. | 380/18 |
| 5,076,040 | 12/1991 | Davis | 53/551 |
| 5,085,469 | 2/1992 | Castro | 283/94 |
| 5,123,892 | 6/1992 | Lin | 493/394 |
| 5,142,016 | 8/1992 | Sharf et al. | 528/60 |
| 5,149,393 | 9/1992 | Hutchinson et al. | 156/555 |
| 5,176,373 | 1/1993 | Namba | 271/3.1 |
| 5,180,153 | 1/1993 | Gegenheimer et al. | 270/53 |
| 5,183,527 | 2/1993 | Parker | 156/555 |
| 5,184,849 | 2/1993 | Taylor | 283/67 |
| 5,201,425 | 4/1993 | Roux et al. | 271/3.1 |
| 5,209,809 | 5/1993 | Walter et al. | 156/539 |
| 5,211,620 | 5/1993 | Ratzel et al. | 493/346 |
| 5,250,138 | 10/1993 | Szewczyk et al. | 156/350 |
| 5,255,106 | 10/1993 | Castro | 358/400 |
| 5,261,985 | 11/1993 | Lin | 156/218 |
| 5,263,698 | 11/1993 | Higuchi et al. | 270/53 |
| 5,275,684 | 1/1994 | Marazzi et al. | 156/359 |
| 5,290,385 | 3/1994 | Downing et al. | 156/350 |
| 5,300,177 | 4/1994 | Downing et al. | 156/290 |
| 5,301,981 | 4/1994 | Nesis | 283/73 |
| 5,350,199 | 9/1994 | Young et al. | 283/91 |
| 5,364,217 | 11/1994 | Bath | 412/37 |
| 5,370,379 | 12/1994 | Wyer | 271/3.1 |
| 5,378,303 | 1/1995 | Traise | 156/555 |
| 5,397,427 | 3/1995 | Traise et al. | 156/555 |
| 5,421,779 | 6/1995 | Castro | 462/8 |
| 5,435,539 | 7/1995 | Namiki | 271/114 |
| 5,466,012 | 11/1995 | Puckett et al. | 283/67 |
| 5,472,185 | 12/1995 | Kollann et al. | 271/303 |
| 5,527,416 | 6/1996 | Traise | 156/290 |
| 5,533,822 | 7/1996 | Tsukada et al. | 400/641 |
| 5,543,010 | 8/1996 | Keng | 156/285 |
| 5,547,181 | 8/1996 | Underwood | 271/114 |
| 5,566,528 | 10/1996 | Lee | 53/460 |

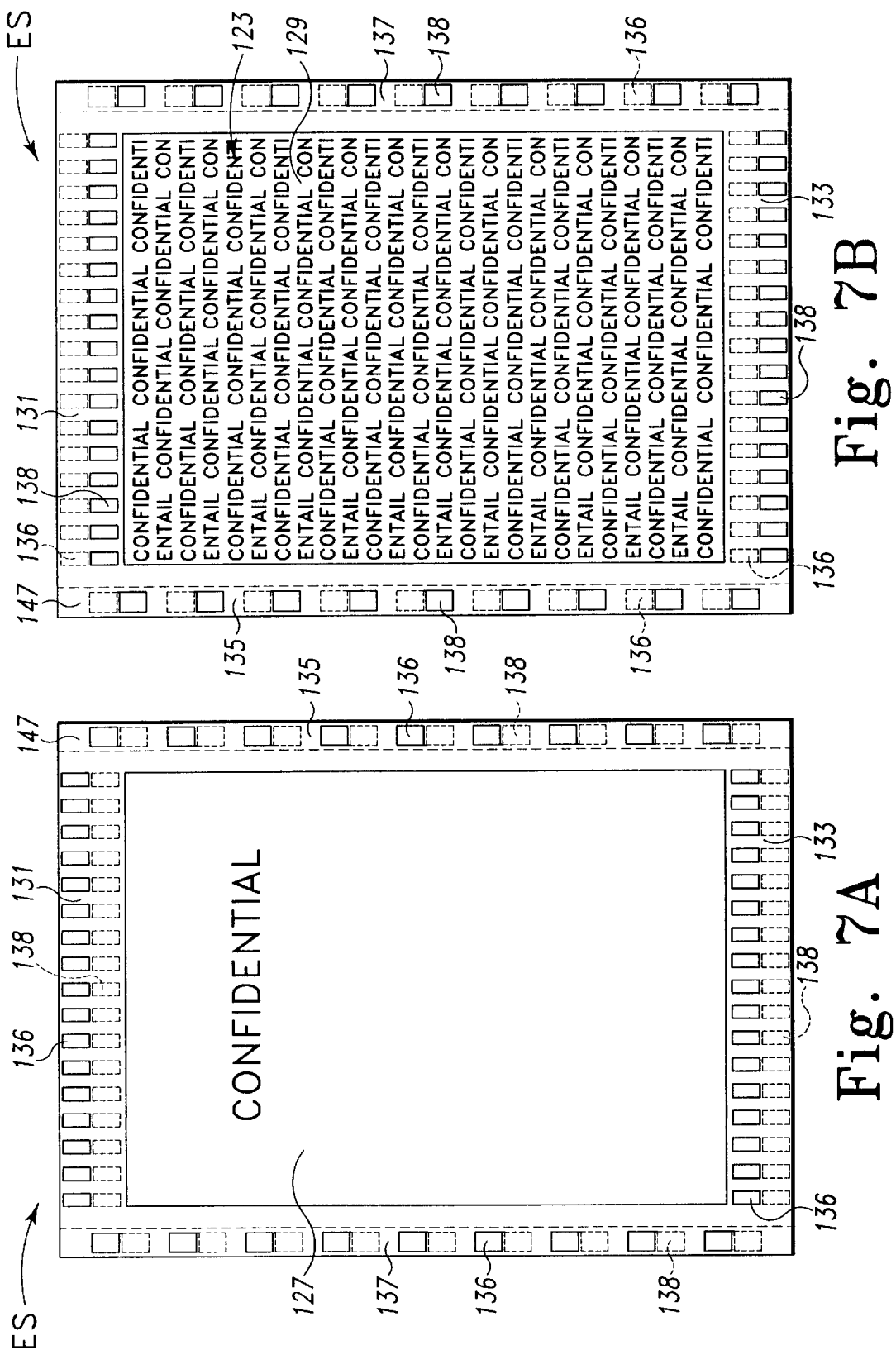

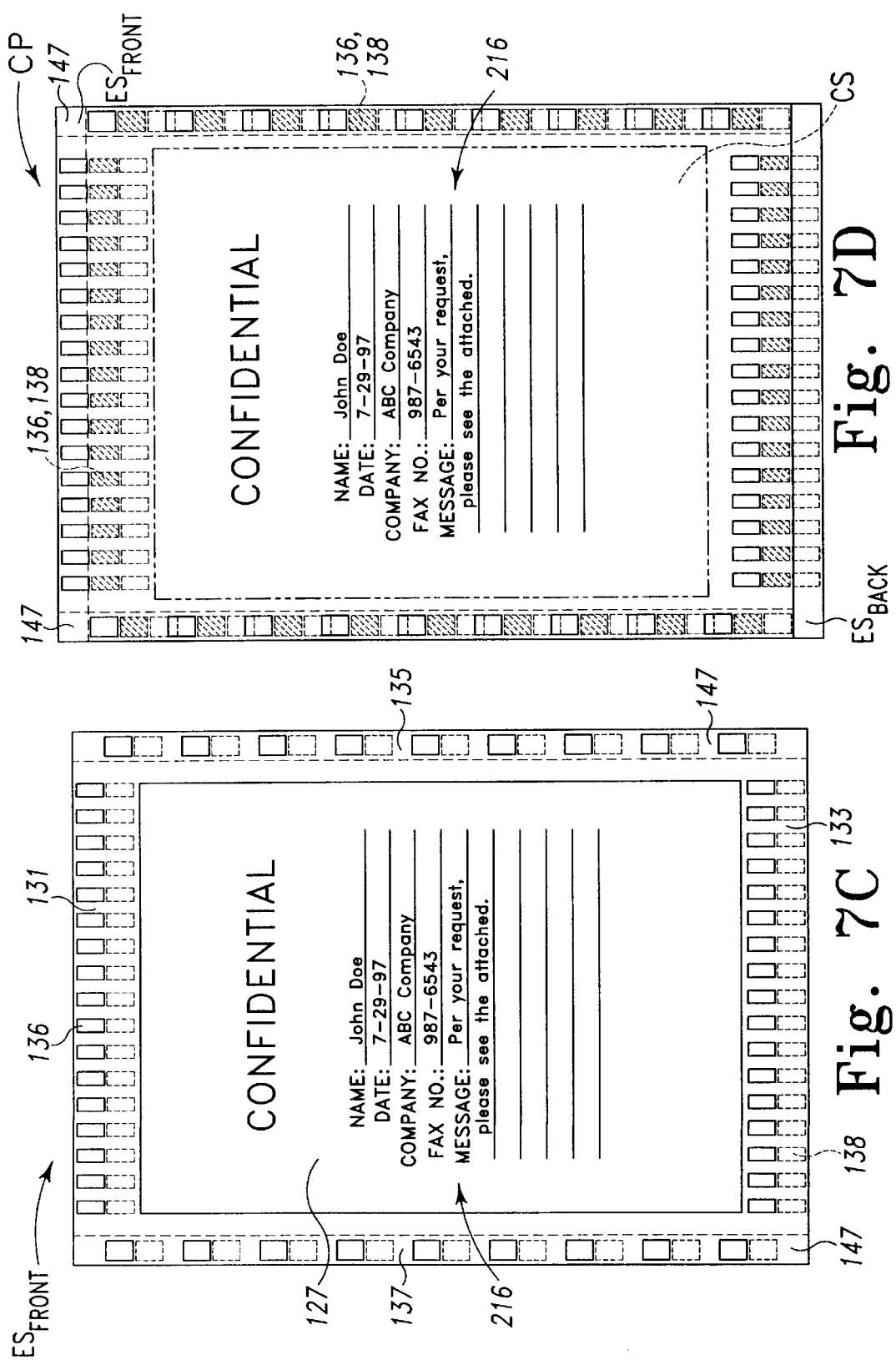

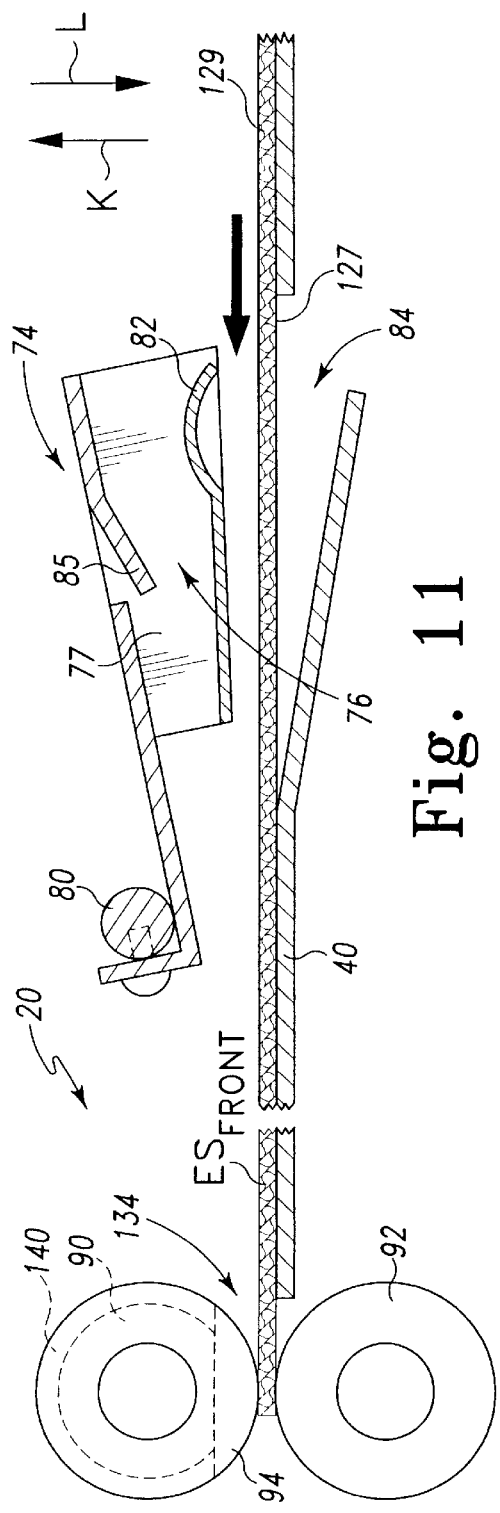
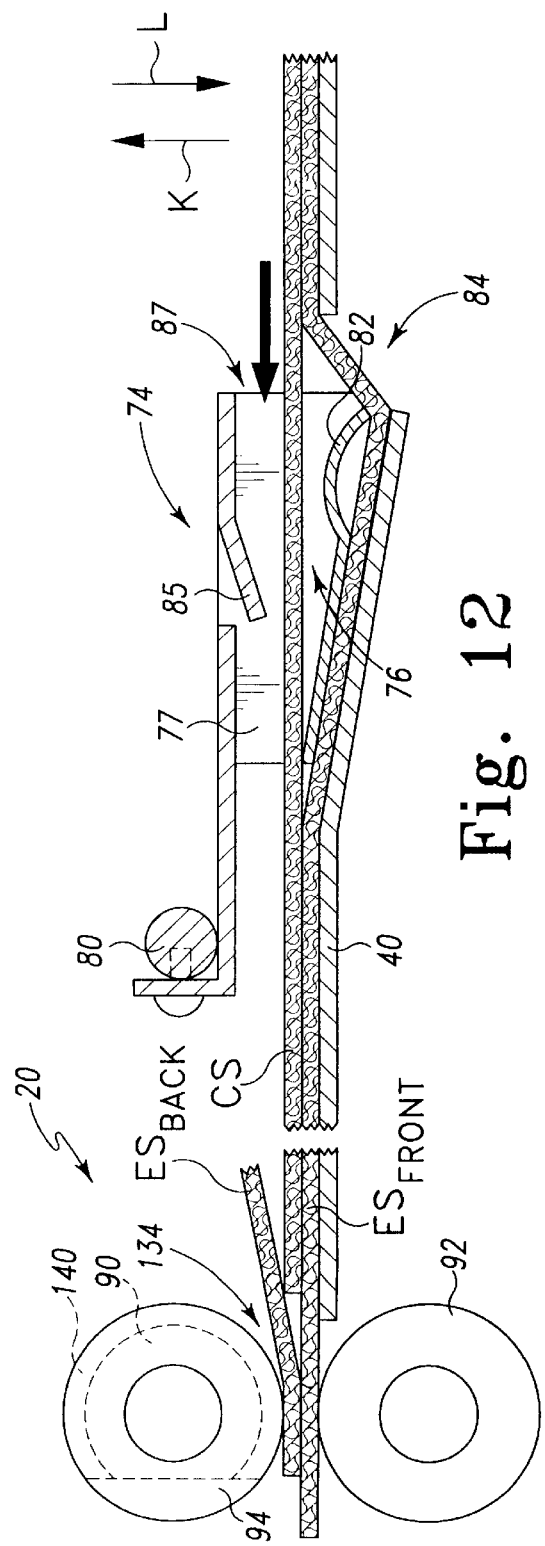

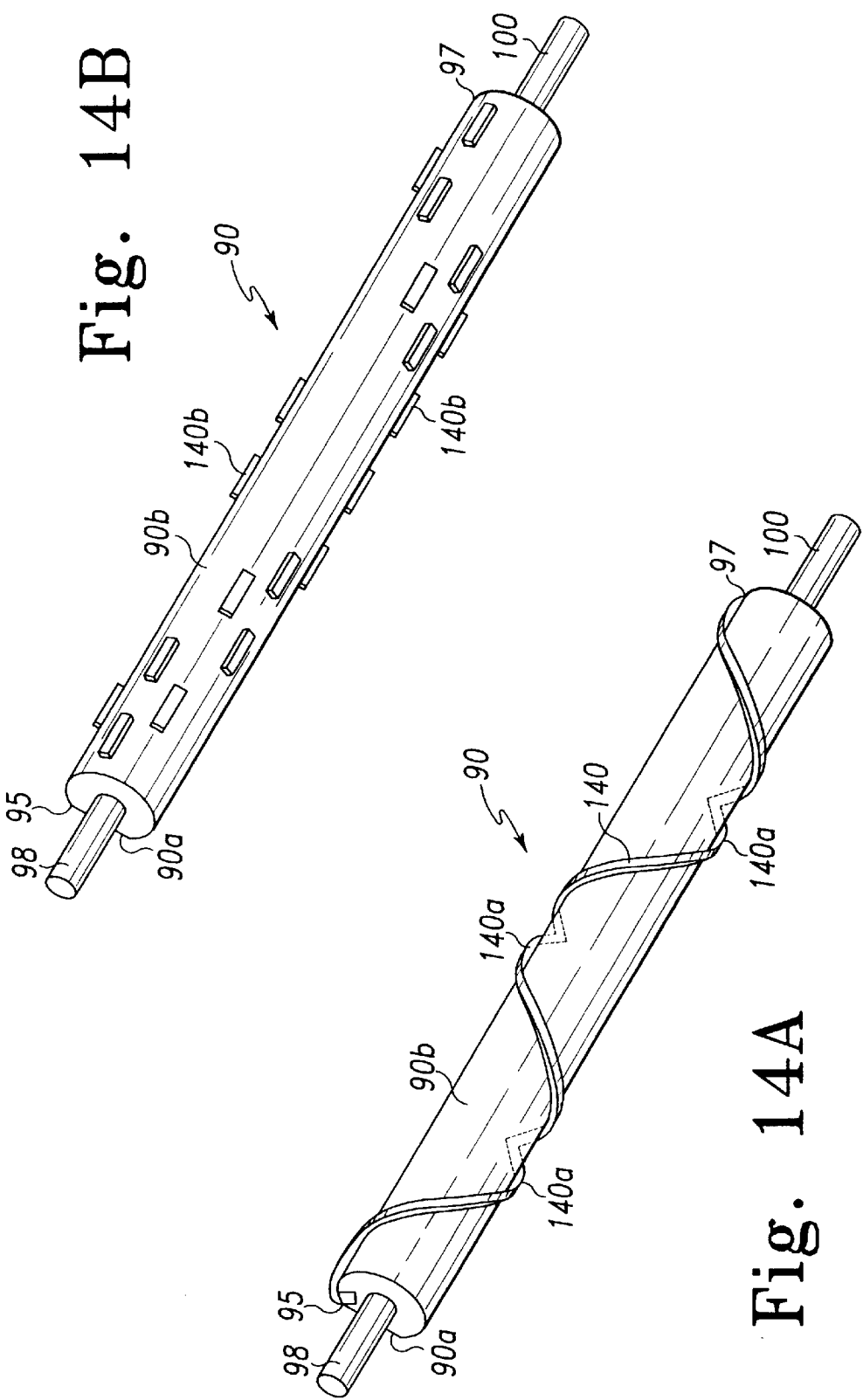

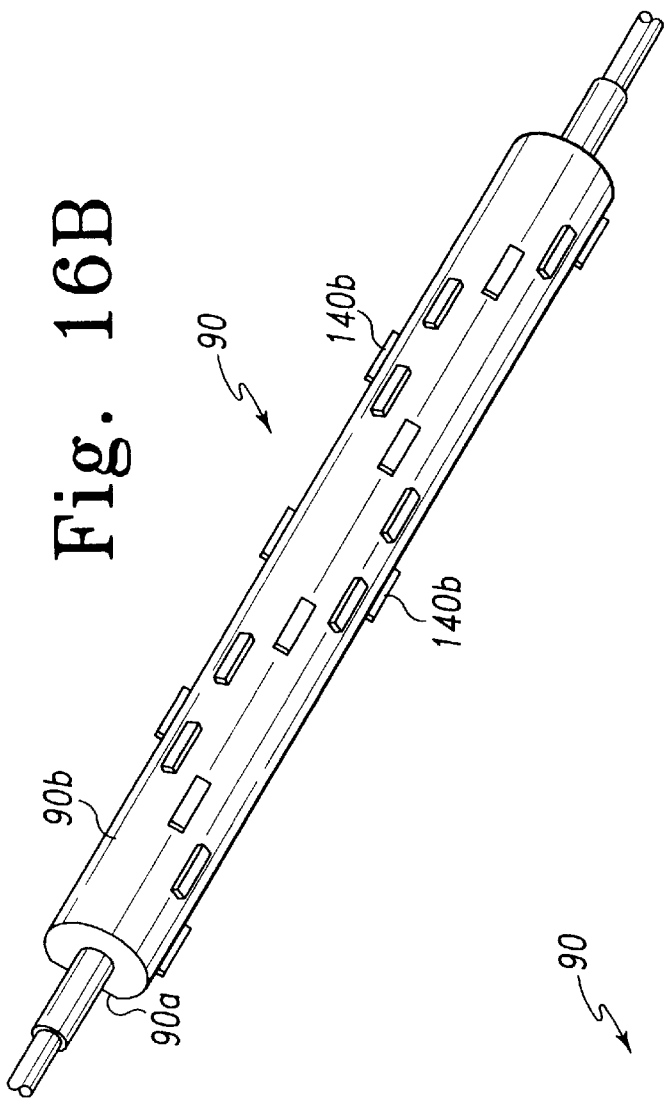
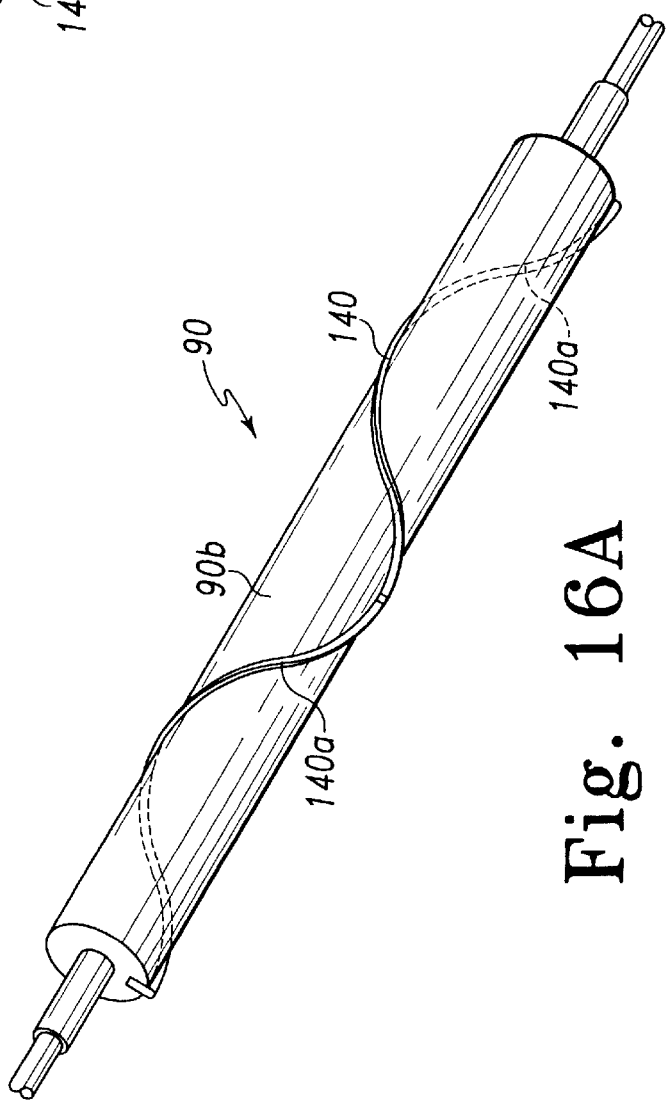

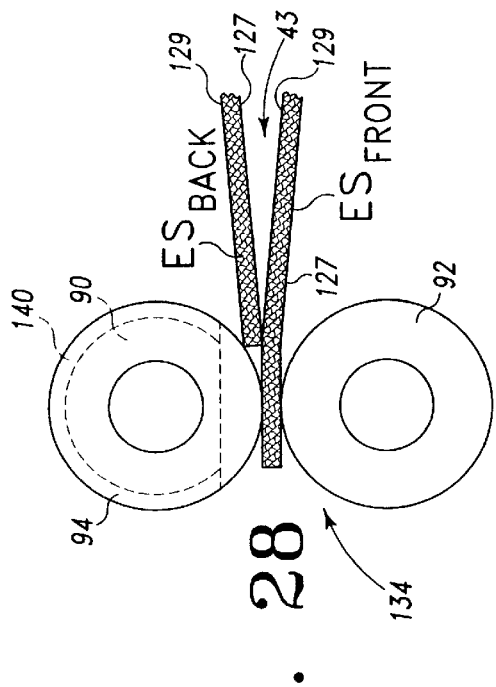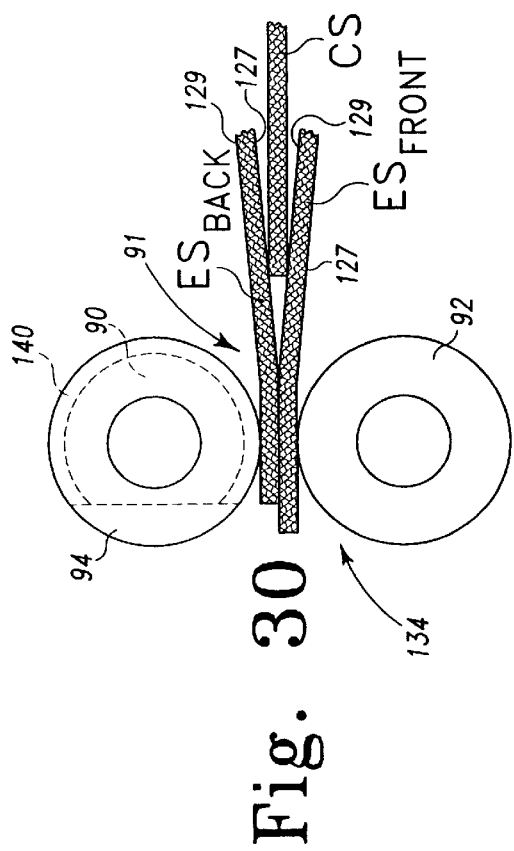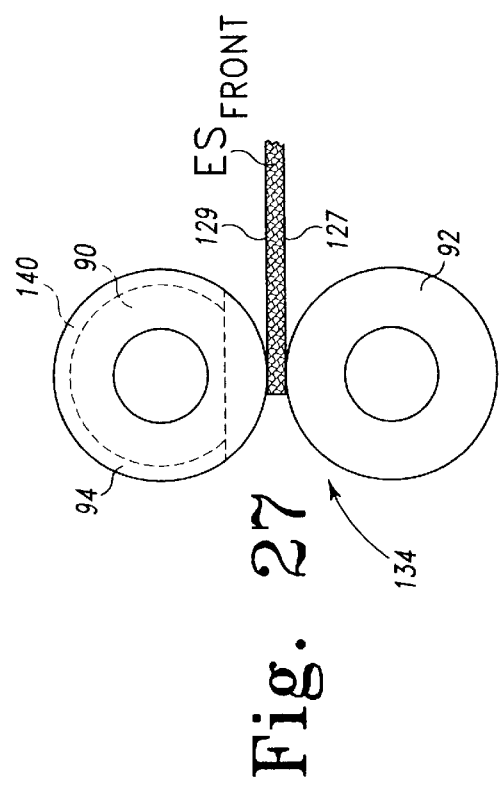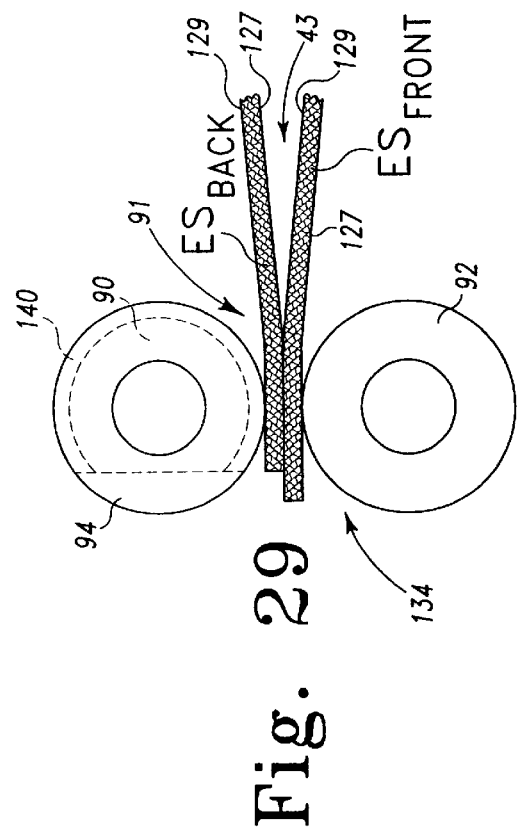

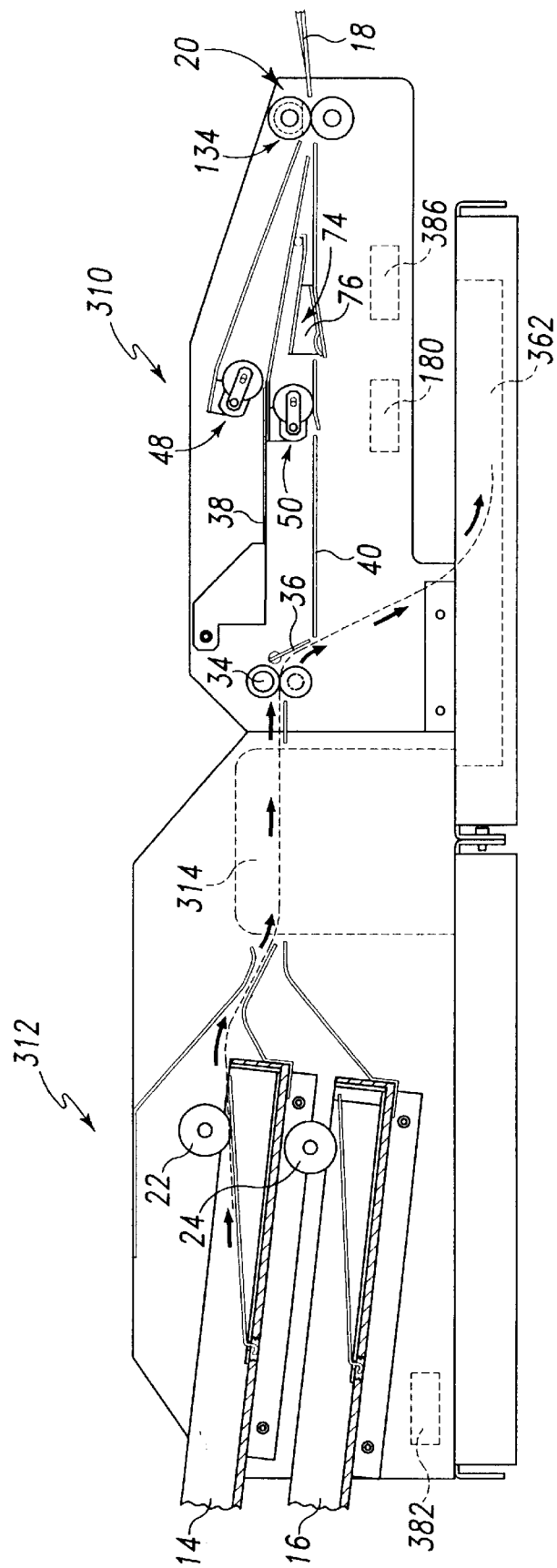

APPARATUS AND METHOD OF SEALING AN ENVELOPE IN A DOCUMENT SECURITY APPARATUS

This application is a continuation-in-part of U.S. patent application Ser. No. 08/767,114 now abandoned, filed Dec. 4, 1996, entitled "Driven Pressure Roller" by William D. Baker, Christopher J. Cooney, George M. Cross, Robert J. Nadeau, and Mark E. Spitler.

CROSS REFERENCE

Cross reference is made to copending U.S. patent applications Ser. No. 08/950,539, entitled "Apparatus and Method for Advancing a Confidential Sheet into a Pocket Defined by a Number of Enclosure Sheets" by George M. Cross; Ser. No. 08/950,470, entitled "Apparatus and Method for Positioning a Number of Non-Transparent Enclosure Sheets in a Document Security Apparatus" by George M. Cross; Ser. No. 08/950,465, entitled "Apparatus and Method for Guiding a Number of Enclosure Sheets and a Number of Confidential Sheets in a Document Security Apparatus" by William D. Baker, Don Barker, George M. Cross, Mark E. Spitler, and Walter J. Steinmayr; Ser. No. 08/951,445, entitled "Apparatus and Method for Enclosing a Confidential Sheet Between a First Enclosure Sheet and a Second Enclosure Sheet within a Document Security Apparatus" by William D. Baker, Don Barker, George M. Cross, Mark E. Spitler, and Walter J. Steinmayr; Ser. No. 08/951,444, entitled "Method for Providing Confidentiality to a Facsimile Transmission Having Information Associated with a First Page of the Transmission Printed on a First Enclosure Sheet" by William D. Baker and George M. Cross; Ser. No. 08/951,446, entitled "Method for Providing Confidentiality to a Facsimile Transmission Having a Non-Printed Back Enclosure Sheet" by William D. Baker and George M. Cross; Ser. No. 08/951,443, entitled "Apparatus and Method of Forming an Envelope in a Document Security Apparatus" by William D. Baker, Don Barker, George M. Cross, Mark E. Spitler, and Walter J. Steinmayr; Ser. No. 08/951,437, entitled "Apparatus and Method for Sealing an Envelope Having a First Lateral Side and a Second Lateral Side in a Document Security Apparatus" by William D. Baker, Don Barker, George M. Cross, Mark E. Spitler, and Walter J. Steinmayr; and Ser. No. 08/951,442, entitled "Apparatus and Method for Sealing an Envelope in a Document Security Apparatus Having a Sealing Roller with a Sealing Ridge Attached Thereto" by William D. Baker, Christopher J. Cooney, George M. Cross, Robert J. Nadeau, and Mark E. Spitler, each of which is assigned to the same assignee as the present invention, and each of which is filed concurrently herewith.

TECHNICAL FIELD OF THE INVENTION

The present invention relates generally to a document reproduction machine, and more particularly to an apparatus and method for providing confidentiality to a document reproduction machine.

BACKGROUND OF THE INVENTION

Document reproduction machines are commonly used in many office and home work environments. Examples of such machines include facsimile machines, laser or ink-jet printers, and photocopy machines. Operation of document reproduction machines typically includes printing information associated with a document onto sheets of paper as the sheets are advanced through the machine, and thereafter stacking or otherwise storing the printed sheets in an output tray associated with the machine. One drawback associated with use of document reproduction machines is a lack of confidentiality. In particular, the printed sheets in the output tray are generally not protected or otherwise obstructed from view and may therefore be viewed by individuals other than the intended recipient.

In regard to facsimile machines, a facsimile transmission is sent from a sending facsimile machine to a receiving facsimile machine which may be located anywhere that may be accessed with a telephone line. Once the facsimile transmission is received by the receiving facsimile machine, information associated with the transmission is printed onto paper sheets, such as plain-paper, 8½"×11" white sheets, and then positioned in an output tray included in the receiving facsimile machine. The printed transmission remains in the output tray until it is claimed or otherwise picked-up by the intended recipient of the transmission. During a period of time between when the facsimile transmission is received and printed by the receiving facsimile machine and when the printed sheets associated with the transmission are claimed by the recipient, the printed sheets of the facsimile transmission may be viewed by individuals other than the intended recipient.

In order to overcome the above drawbacks, a number of devices have heretofore been designed for the purpose of providing confidentiality to a facsimile transmission. For example, devices have heretofore been designed which print and thereafter stack the ordered pages associated with the facsimile transmission in an intermediate tray or bin. Once the last page of the transmission is positioned on the stack, the entire stack is advanced in unison through the throat of a number of staplers thereby stapling the pages of the facsimile transmission to one another. However, by stacking the pages after printing, such devices invert the order of the pages within the stack (i.e. the top or first page of the stack is the last page of the transmission) thereby causing the first page of the facsimile message, which typically identifies the intended recipient, to be positioned on the bottom of the stack (with the printed side thereof facing inwardly toward the stack) thereby disadvantageously concealing the identity of the intended recipient within the stapled stack. In addition, the recipient of the facsimile transmission may find it inconvenient to open the stapled stack since multiple staples are used to secure the individual printed sheets of the facsimile transmission to each other. Also, devices which perform such a stapling operation are relatively mechanically complex and expensive to manufacture and operate.

Another type of device which has heretofore been designed to overcome the above drawbacks seals the printed facsimile transmission in a clear, plastic envelope. In particular, the printed transmission is first folded such that the front page of the transmission is visible. Thereafter, the folded transmission is advanced into a clear, plastic envelope which is then sealed. However, this type of device is relatively mechanically complex in that numerous mechanisms must be provided to (1) fold the printed sheets, (2) store and transport the clear, plastic material, (3) place the folded transmission in the clear, plastic envelope, and (4) seal the envelope.

What is needed therefore is an apparatus and method which overcomes the aforementioned drawbacks associated with use of a document reproduction machine. What is also needed is an apparatus and method for providing confidentiality to a printing operation. What is further needed is an apparatus and method for providing confidentiality to a facsimile transmission which overcomes the drawbacks associated with such devices which have heretofore been designed.

SUMMARY OF THE INVENTION

In accordance with a first embodiment of the present invention, there is provided a sealing assembly. The sealing assembly includes a support roller. The sealing assembly also includes a center roller having a sealing ridge attached thereto which operatively contacts the support roller so as to urge a first enclosure sheet into contact with a second enclosure sheet. The sealing assembly further includes a first edge roller which operatively contacts the support roller so as to urge the first enclosure sheet into contact with the second enclosure sheet. The center roller and the first edge roller are rotatably supported on a common axis. The center roller rotates independently of the first edge roller.

In accordance with a second embodiment of the present invention, there is provided a method of sealing an envelope in a document security apparatus. The method includes the step of advancing a first enclosure sheet and a second enclosure sheet in a path of movement so that the first enclosure sheet is positioned between (1) a center roller and a support roller, and (2) a first edge roller and the support roller. The first enclosure sheet includes a first pressure sensitive adhesive thereon. The second enclosure sheet includes a second pressure sensitive adhesive thereon. The method also includes the step of urging the first pressure sensitive adhesive toward the second pressure sensitive adhesive with the center roller so as to form a first seal portion which extends in a first direction which is perpendicular to the path of movement of the first and second enclosure sheets. The method further includes the step of urging the first pressure sensitive adhesive toward the second pressure sensitive adhesive with the first end roller so as to form a second seal portion which extends in a second direction which is parallel to the path of movement of the first and second enclosure sheets.

In accordance with a third embodiment of the present invention, there is provided a sealing assembly. The sealing assembly includes a support surface. The sealing assembly also includes a center sealer which operatively contacts the support surface so as to urge a first enclosure sheet into contact with a second enclosure sheet. The sealing assembly further includes an edge sealer which operatively contacts the support surface so as to urge the first enclosure sheet into contact with the second enclosure sheet. The center sealer and the edge sealer are rotatably supported on a common axis, and the center sealer rotates independently of the edge sealer.

It is therefore an object of the present invention to provide a new and useful apparatus for providing confidentiality to a printing operation.

It is also an object of the present invention to provide an improved apparatus for providing confidentiality to a printing operation.

It is moreover an object of the present invention to provide a new and useful method of providing confidentiality to a printing operation.

It is further an object of the present invention to provide an improved method of providing confidentiality to a printing operation.

It is another object of the present invention to provide a new and useful apparatus for providing confidentiality to a facsimile transmission.

It is also an object of the present invention to provide an improved apparatus for providing confidentiality to a facsimile transmission.

It is moreover an object of the present invention to provide a new and useful method of providing confidentiality to a facsimile transmission.

It is further an object of the present invention to provide an improved method of providing confidentiality to a facsimile transmission.

It is yet another object of the present invention to provide an apparatus for providing confidentiality to a printing operation which is less mechanically complex relative to document security devices which have heretofore been designed.

It is moreover an object of the present invention to provide an apparatus for providing confidentiality to a printing operation which is less expensive to manufacture and operate relative to document security devices which have heretofore been designed.

It is also an object of the present invention to provide an apparatus for providing confidentiality to a printing operation which produces a printed output that is conveniently packaged or otherwise sealed for future access by an intended recipient.

It is also an object of the present invention to provide an apparatus for providing confidentiality to a printing operation which produces an addressed confidential packet which is easily identifiable in a stack of packets or documents.

The above and other objects, features, and advantages of the present invention will become apparent from the following description and the attached drawings.

BRIEF DESCRIPTION OF THE DRAWINGS

FIG. 7A is an elevational view of the front side of the enclosure sheet which is advanced through the document security apparatus of FIG. 1;

FIG. 7B is a view similar to FIG. 7A, but showing a back side of the enclosure sheet;

FIG. 7C is a view similar to FIG. 7A, but showing the front enclosure sheet $ES_{FRONT}$ with information associated with the first page of the facsimile transmission printed thereon;

FIG. 7D is an elevational view of the sealed confidential packet CP which is produced by the document security apparatus of FIG. 1;

FIG. 11 is a cross sectional view showing the deflector arm 76 of the sheet guiding assembly of FIG. 10 in the raised position;

FIG. 12 is a view similar to FIG. 11, but showing the deflector arm 76 in the lowered position;

FIG. 14A is a perspective view of a first embodiment of the sealing roller of the sealing assembly of FIG. 13;

FIG. 14B is a view similar to FIG. 14A, but showing a second embodiment of the sealing roller;

FIG. 16A is a view similar to FIG. 14A, but showing a fifth embodiment of the sealing roller;

FIG. 16B is a view similar to FIG. 14A, but showing a sixth embodiment of the sealing roller;

FIG. 27 is a side elevational view showing the front enclosure sheet $ES_{FRONT}$ being advanced into the nip of the nip roller assembly 134 of the document security apparatus of FIG. 1;

FIG. 28 is a view similar to FIG. 27, but showing the back enclosure sheet $ES_{BACK}$ being advanced toward the nip so as to form the pocket 43;

FIG. 29 is a view similar to FIG. 28, but showing the leading edge portion of the front enclosure sheet $ES_{FRONT}$ sealed to the leading edge potion of the back enclosure sheet $ES_{BACK}$ so as to form the envelope 91;

FIG. 30 is a view similar to FIG. 29, but showing one of the confidential sheets CS being advanced into the envelope 91;

FIG. 35 is a view similar to FIG. 32, but showing a fourth paper path of travel.

DETAILED DESCRIPTION OF THE INVENTION

Figure 1:
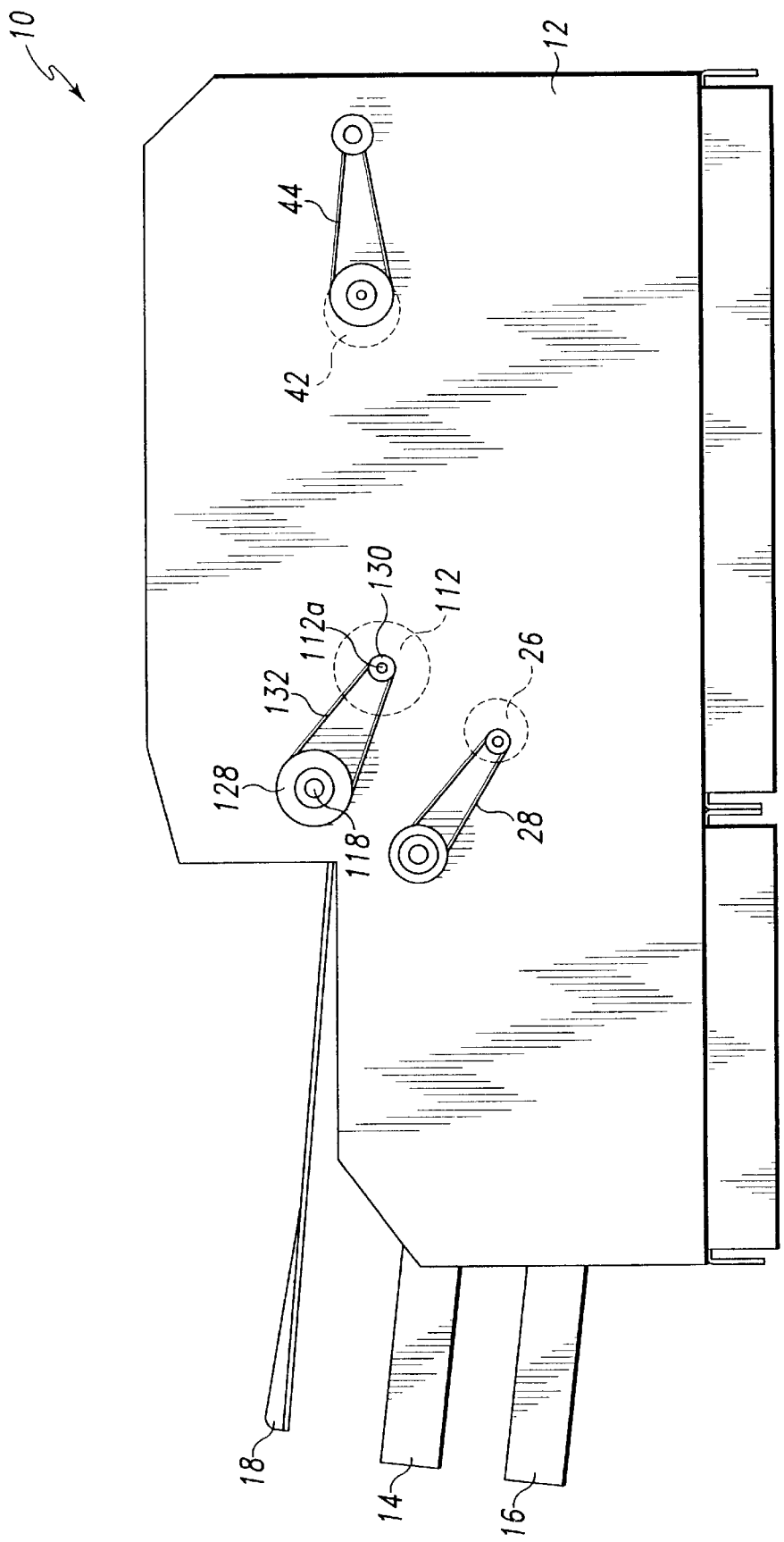
FIG. 1 is a right side elevational view of a first embodiment of a document security apparatus which incorporates the features of the present invention therein.
Figure 2:
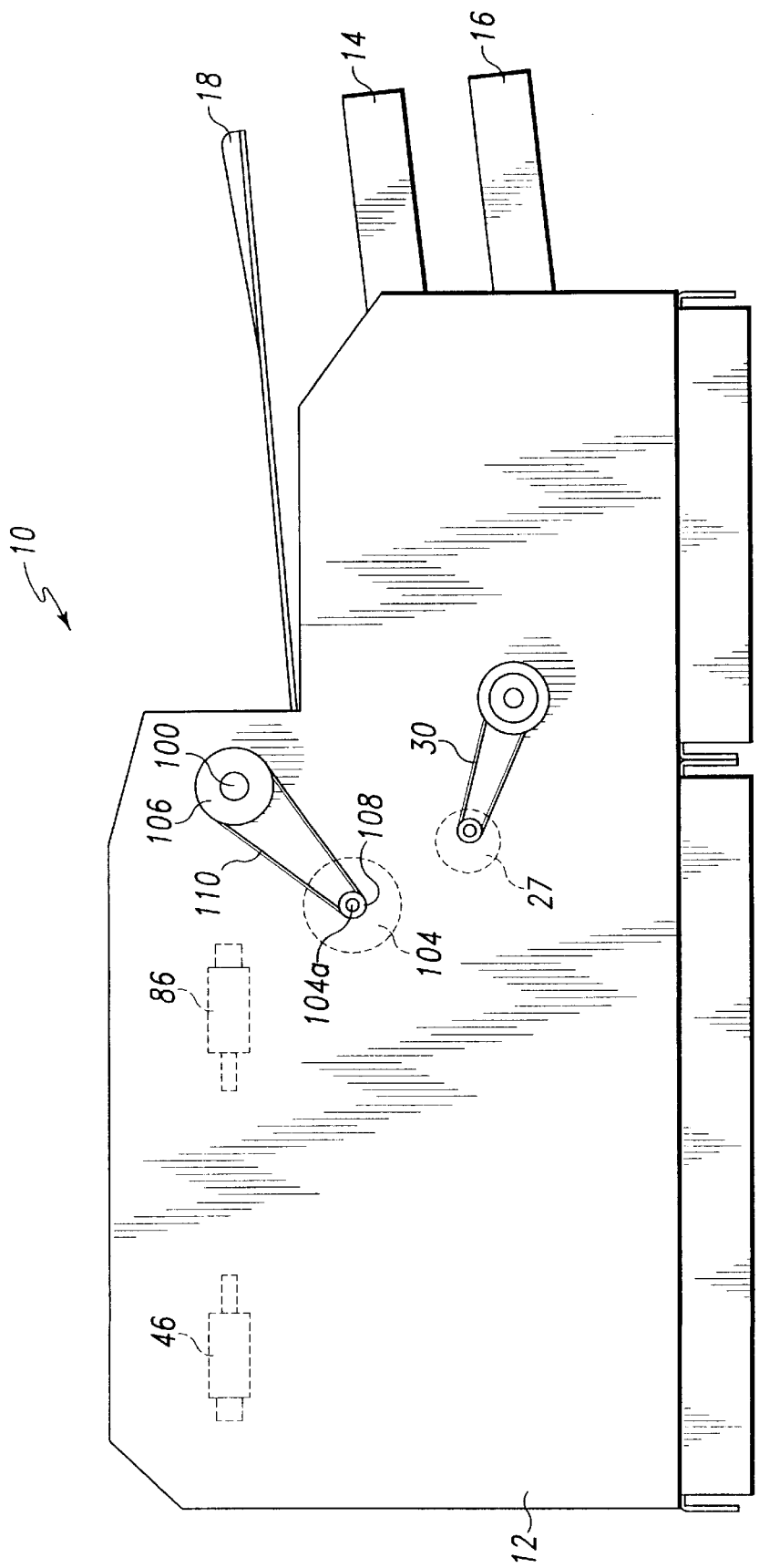
FIG. 2 is left side elevational view of the document security apparatus of FIG. 1.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIGS. 1–6, there is shown a document security apparatus 10. The document security apparatus 10 includes a housing 12, an upper input tray 14, a lower input tray 16, an output tray 18, and a sealing station 20.

A pair of belt driven feeding rollers 22, 24 (see FIG. 4) are provided to advance sheets out of the upper input tray 14 and the lower input tray 16, respectively. In particular, the feeding rollers 22 are coupled to an output pinion of a roller drive motor 26 via a belt 28, whereas the feeding rollers 24 are coupled to an output pinion of a roller drive motor 27 via a belt 30. A number of confidential sheets CS are advanced by the feeding rollers 22 out of the upper input tray 14 and into a print engine 32 (see FIGS. 4–6). Similarly, a number of enclosure sheets ES (see FIG. 7) are advanced by the feeding rollers 24 out of the lower input tray 16 and into the print engine 32.

What is meant herein by the term "confidential sheets" is sheets of paper, such as standard 8½"×11" white, 20 lb. paper sheets, which are to be advanced through the print engine 32 in order to have confidential information associated with a printing operation, such as is a facsimile transmission, printed thereon, and thereafter be enclosed between two of the enclosure sheets ES (see FIG. 7). One type of paper which is suitable for use as the confidential sheets CS in the present invention is item number 4024 DP, 8½"×11", 20 lb. white paper which is commercially available from Xerox Corporation of Rochester, N.Y. It should be appreciated that non-confidential information may also be printed on the confidential sheets CS.

The print engine 32 may be any known print engine that may be configured to fit within the housing 12. For example, the print engine 32 may be a known ink-jet, laser, LED, or thermal print engine. As shall be discussed in more detail below, the print engine 32 may be used to selectively print information associated with a facsimile transmission onto the confidential sheets CS and the enclosure sheets ES.

The print engine 32 includes a number of advancing rollers (not shown) or the like for advancing the confidential sheets CS and the enclosure sheets ES therethrough during printing. A belt driven advancing roller 34 (see FIG. 4) is provided to advance the confidential sheets CS and the enclosure sheets ES from the print engine 32, through a diverter 36, and onto either (1) an upper support or plate 38, or (2) a lower support or plate 40. In particular, the advancing roller 34 is coupled to an output pinion of a roller drive motor 42 via a belt 44 in order to provide the operative power necessary to advance the enclosure sheets ES and the confidential sheets CS in the manner described.

Figure 3:
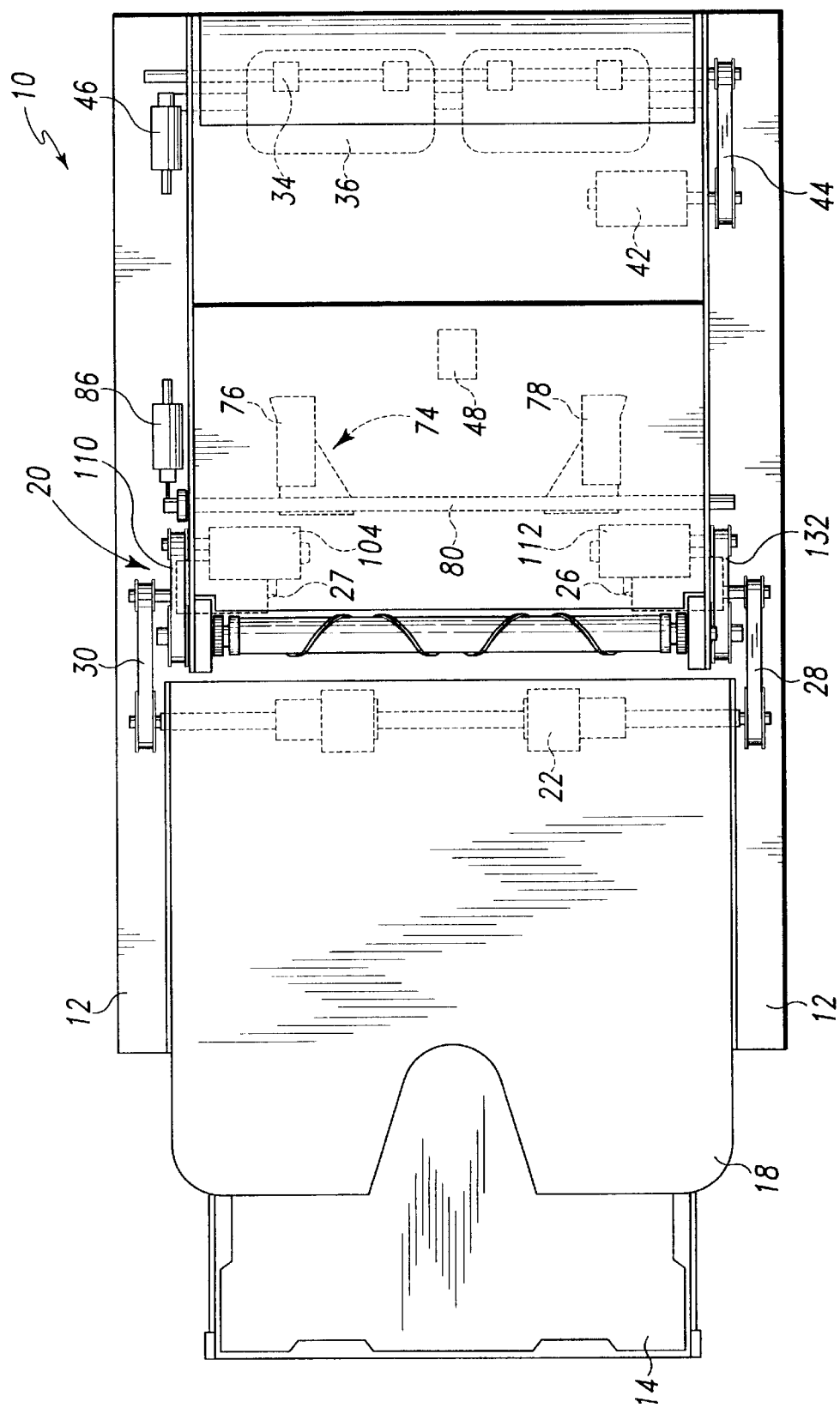
FIG. 3 is a top elevational view of the document security apparatus of FIG. 1.
Figure 4:
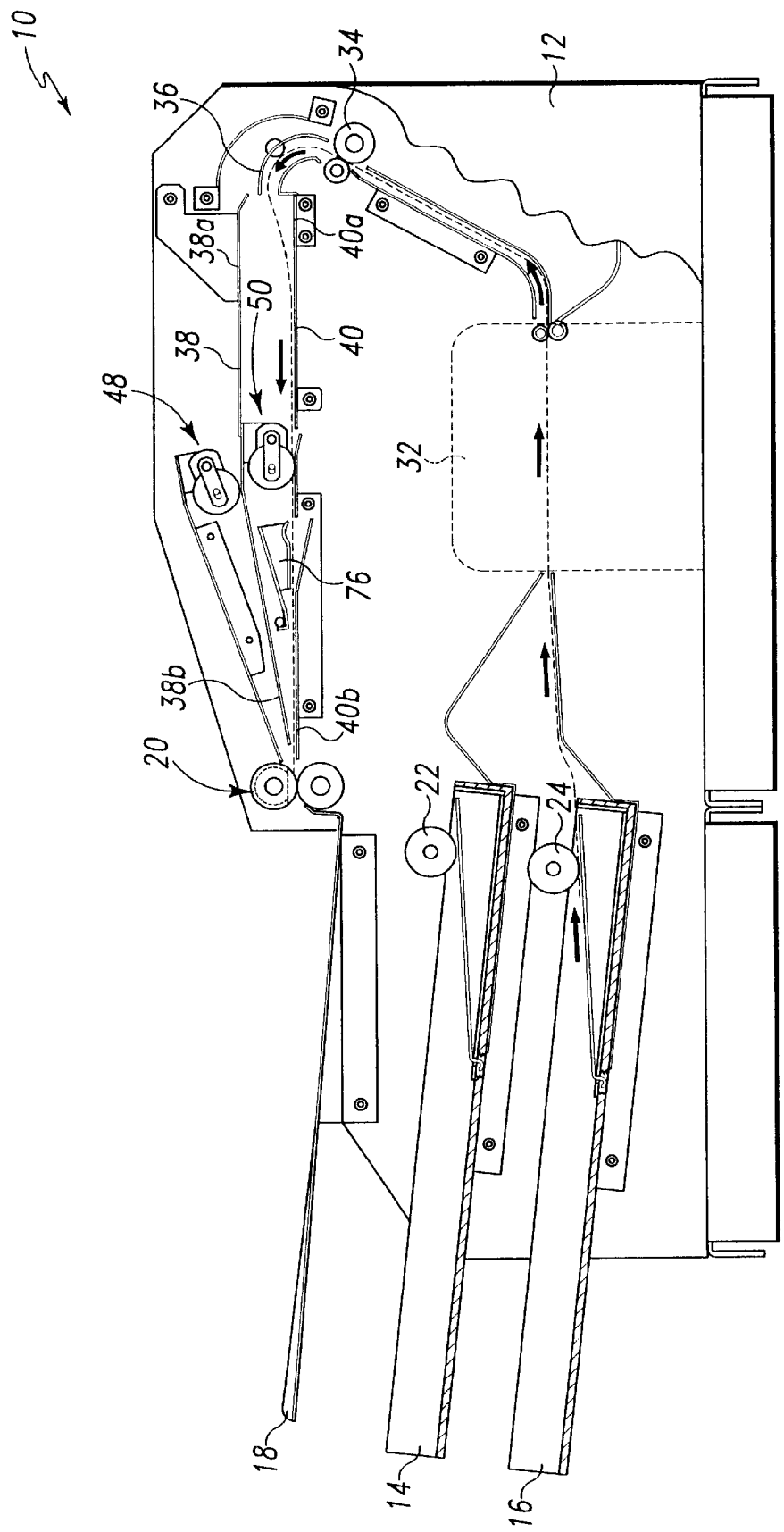
FIG. 4 is a schematic view of the document security apparatus of FIG. 1 showing a first paper path of travel.

The diverter 36 is coupled to a diverter solenoid 46 (see FIG. 3) thereby permitting the diverter 36 to be moved between a number of positions such that the confidential sheets CS and the enclosure sheets ES may be selectively diverted to either the upper plate 38 or the lower plate 40 (see FIG. 4). In particular, the diverter 36 may be positioned in a first diverter position in order to direct the confidential sheets CS and the enclosure sheets ES onto the lower plate 40 when the confidential sheets CS and the enclosure sheets ES are advanced so as to strike or otherwise hit the diverter 36. Alternatively, the diverter 36 may be positioned in a second diverter position in order to direct one of the enclosure sheets ES onto the upper plate 38 when one of the enclosure sheets ES is advanced so as to strike or otherwise hit the diverter 36. It should be appreciated that other types of actuators may be used in addition to, or in lieu of, the diverter solenoid 46 to move the diverter 36. For example, the diverter 36 may be moved between the first diverter position and the second diverter position with a stepper motor. Use of a stepper motor also enables the diverter 36 to be moved between a number of diverter positions in addition to the first diverter position and the second diverter position. For example, as shall be discussed in more detail below in regard to FIG. 35, the stepper motor may position the diverter in a third diverter position in order to divert the printed confidential sheets CS into a non-confidential output tray when the confidential sheets CS have non-confidential information printed thereon.

Figure 31:
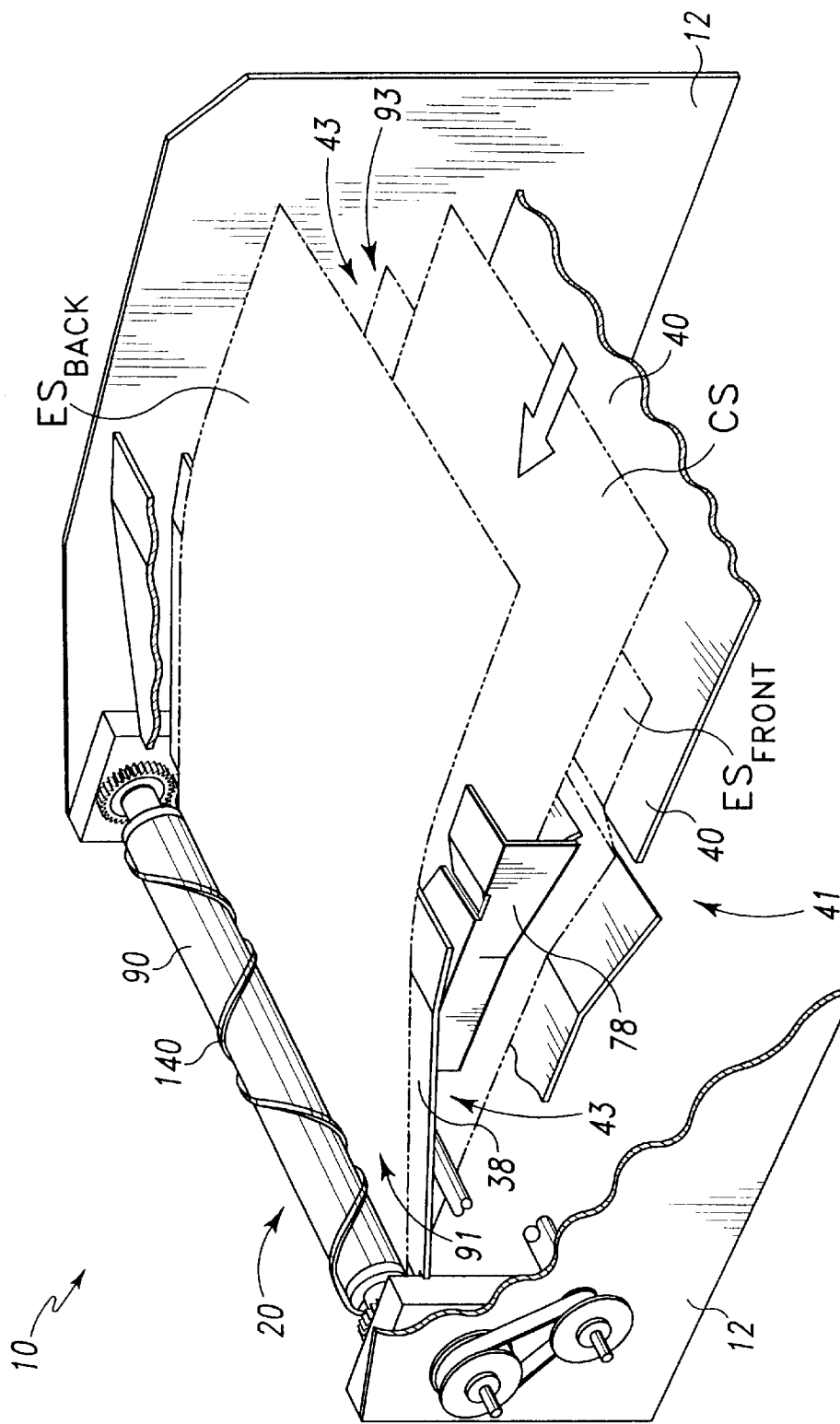
FIG. 31 is a perspective view of the bail system 41 of the document security apparatus of FIG. 1.

Collectively, the upper plate 38 and the lower plate 40 define a bail system 41 (see FIG. 9) of the document security apparatus 10. As shown in FIG. 31, when a pair of enclosure sheets ES are positioned in the bail system 41, a pocket 43 is formed. In particular, when a first or front enclosure sheet $ES_{FRONT}$ is positioned on the lower plate 38 and a second or back enclosure sheet $ES_{BACK}$ is positioned on the upper plate 40, the pocket 43 is formed. What is meant herein by the term "pocket" is a substantially enclosed area defined by the area between the front enclosure sheet $ES_{FRONT}$ and the back enclosure sheet $ES_{BACK}$ when the front enclosure sheet $ES_{FRONT}$ and the back enclosure sheet $ES_{BACK}$ are both positioned as shown in the bail system 41. It should be appreciated that the confidential sheets CS are advanced into the pocket 43 in order to be positioned between the front enclosure sheet $ES_{FRONT}$ and the back enclosure sheet $ES_{BACK}$. When the front enclosure sheet $ES_{FRONT}$ and the back enclosure sheet $ES_{BACK}$ are both positioned in the bail system 41 so as to form the pocket 43, an entire confidential sheet CS is advanced so as to be interposed between the front enclosure sheet $ES_{FRONT}$ and the back enclosure sheet $ES_{BACK}$ in order to be completely concealed. It should be appreciated that although the bail system 41 is described herein as including the upper plate 38 and the lower plate 40, and has significant advantages thereby in the present invention, numerous other configurations of the bail system 41 may provide many of the advantages of the present invention, it being understood that any mechanism that is capable of directing the front enclosure sheet $ES_{FRONT}$ and the back enclosure sheet $ES_{BACK}$ so as to define the pocket 43 may be used as the bail system 41.

The document security apparatus 10 further includes a pair of scuffer assemblies 48, 50 as shown in FIGS. 4–6, 8, and 9. The scuffer assembly 48 is provided to advance the back enclosure sheet $ES_{BACK}$ along the upper plate 38, whereas the scuffer assembly 50 is provided to advance the confidential sheets CS and the front enclosure sheets $ES_{FRONT}$ along the lower plate 40.

Figure 9:
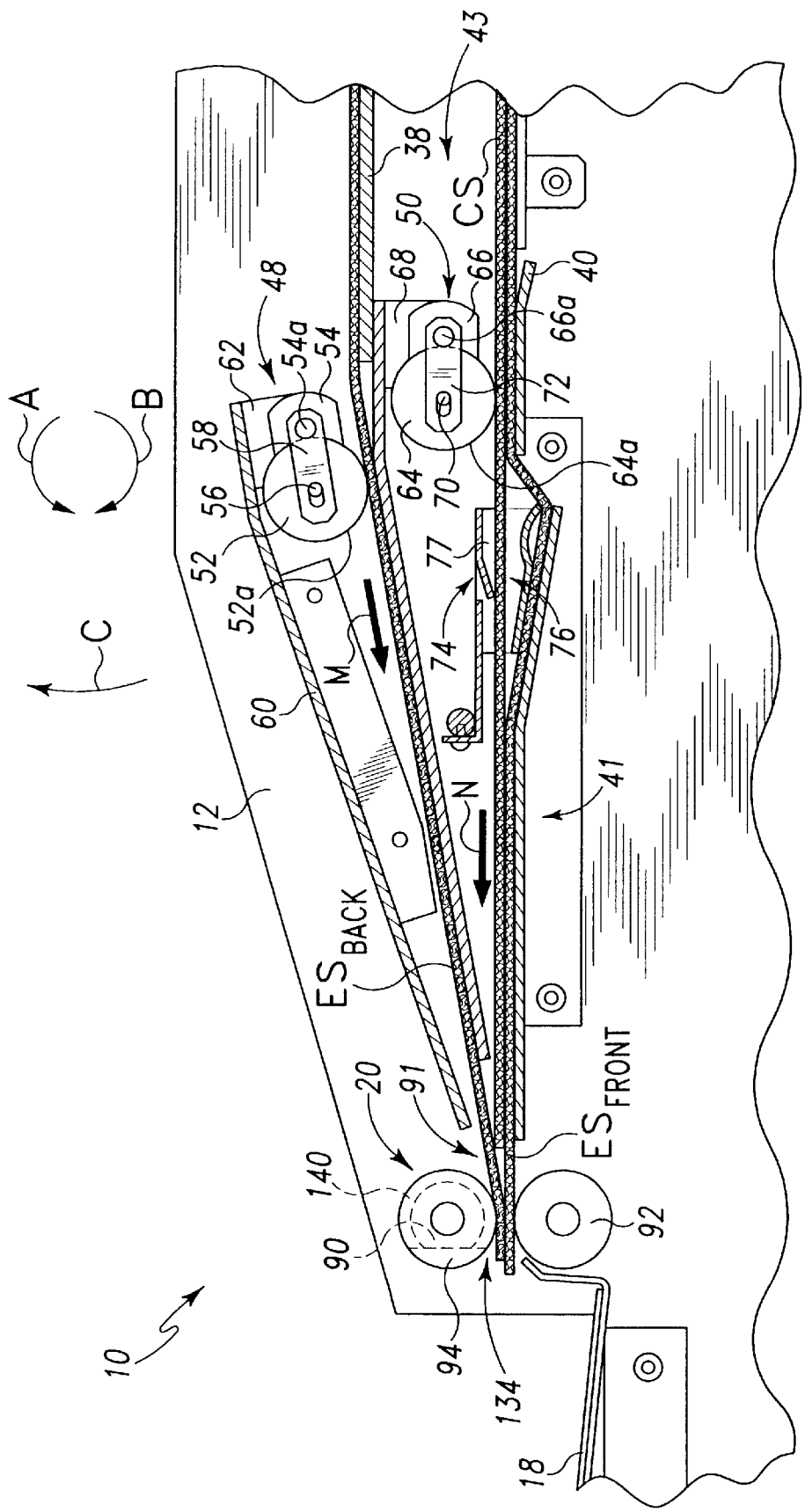
FIG. 9 is an enlarged partial cross-sectional view showing the relationship between the scuffer assemblies 48 and 50, and the sealing station 20 of the document security apparatus of FIG. 1.

As shown in FIG. 9, the scuffer assembly 48 includes an advancing or scuffer wheel 52. The scuffer wheel 52 is driven by a scuffer drive motor 54. The scuffer drive motor 54 includes an output shaft 54a. Preferably, the scuffer drive motor 54 is embodied as a known stepper motor. Hence, the output shaft 54a is rotated a predetermined distance each time the scuffer drive motor 54 receives an electrical impulse. Moreover, the output shaft 54a contacts an outer circumferential surface 52a of the scuffer wheel 52 in order to drive the scuffer wheel 52. More specifically, as the output shaft 54a is rotated in the general direction of arrow A of FIG. 9, the scuffer wheel 52 is driven in the general direction of arrow B of FIG. 9. The scuffer wheel 52 is driven in short pulses in order to constantly nudge the back enclosure sheet $ES_{BACK}$ along the upper plate 38 in a forward path of movement as indicated by arrow M of FIG. 9.

The scuffer assembly 48 is secured to the housing 12 via a baffle plate 60. More specifically, the scuffer drive motor 54 has a first portion of a mounting plate 62 secured thereto. As shown in FIG. 9, a second portion of the mounting plate 62 is secured to the baffle plate 60 thereby securing the scuffer assembly 48 to the baffle plate 60 and hence the housing 12. The scuffer wheel 52 is rotatably coupled to a scuffer axle 56 which is in turn non-rotatably coupled to a first end of a support arm 58. The output shaft 54a of the scuffer drive motor 54 is rotatably coupled to a second end of the support arm 58 thereby allowing the scuffer assembly 48 to compensate for the height of the back enclosure sheet $ES_{BACK}$ advancing thereunder. More specifically, as one of the back enclosure sheets $ES_{BACK}$ is advanced between the scuffer wheel 52 and the upper plate 38, the first end of the support arm 58 rotates in the general direction of arrow C of FIG. 9 thereby causing the scuffer wheel 52 to be likewise urged in the general direction of arrow C of FIG. 9.

Figure 5:
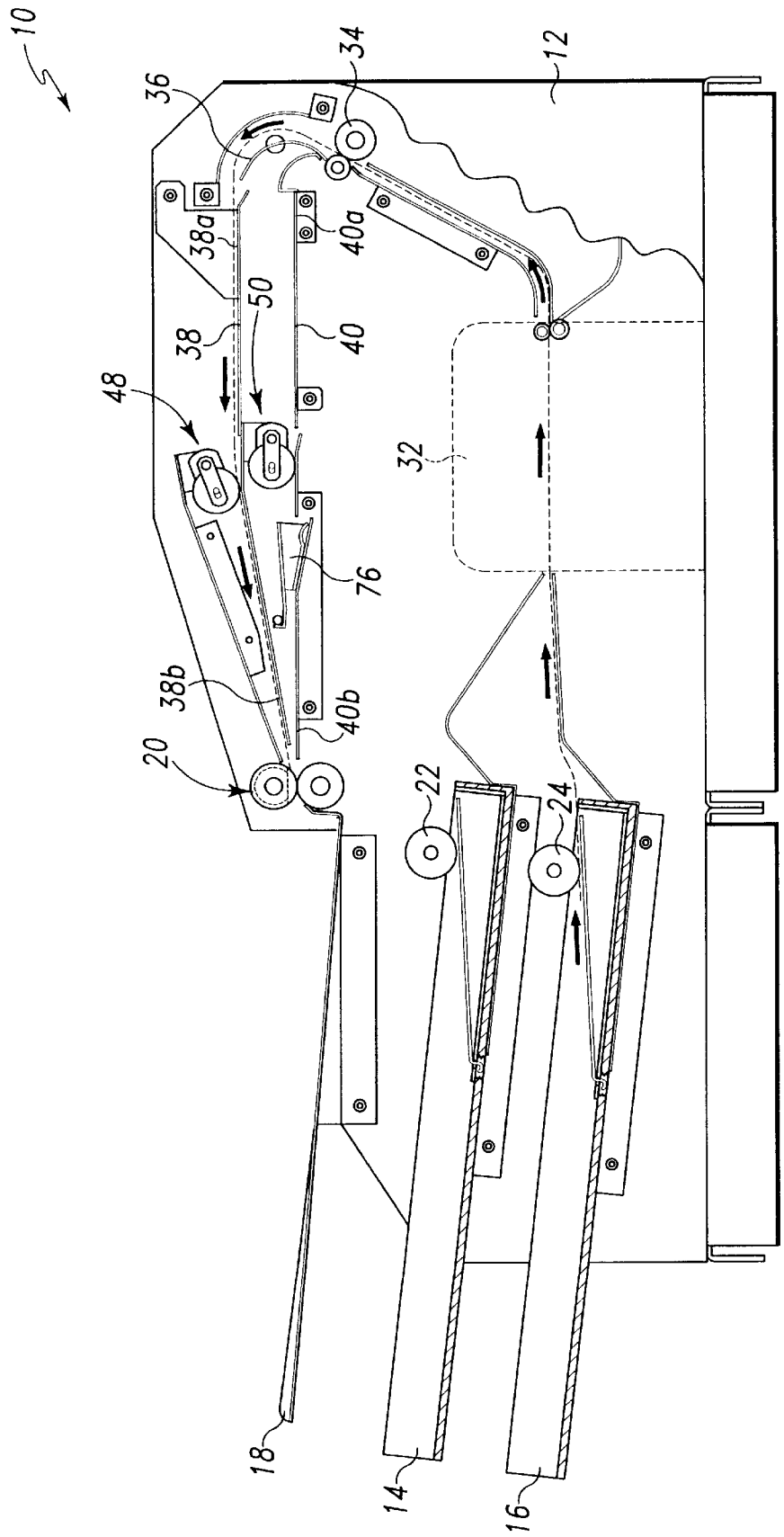
FIG. 5 is a view similar to FIG. 4, but showing a second paper path of travel.
Figure 6:
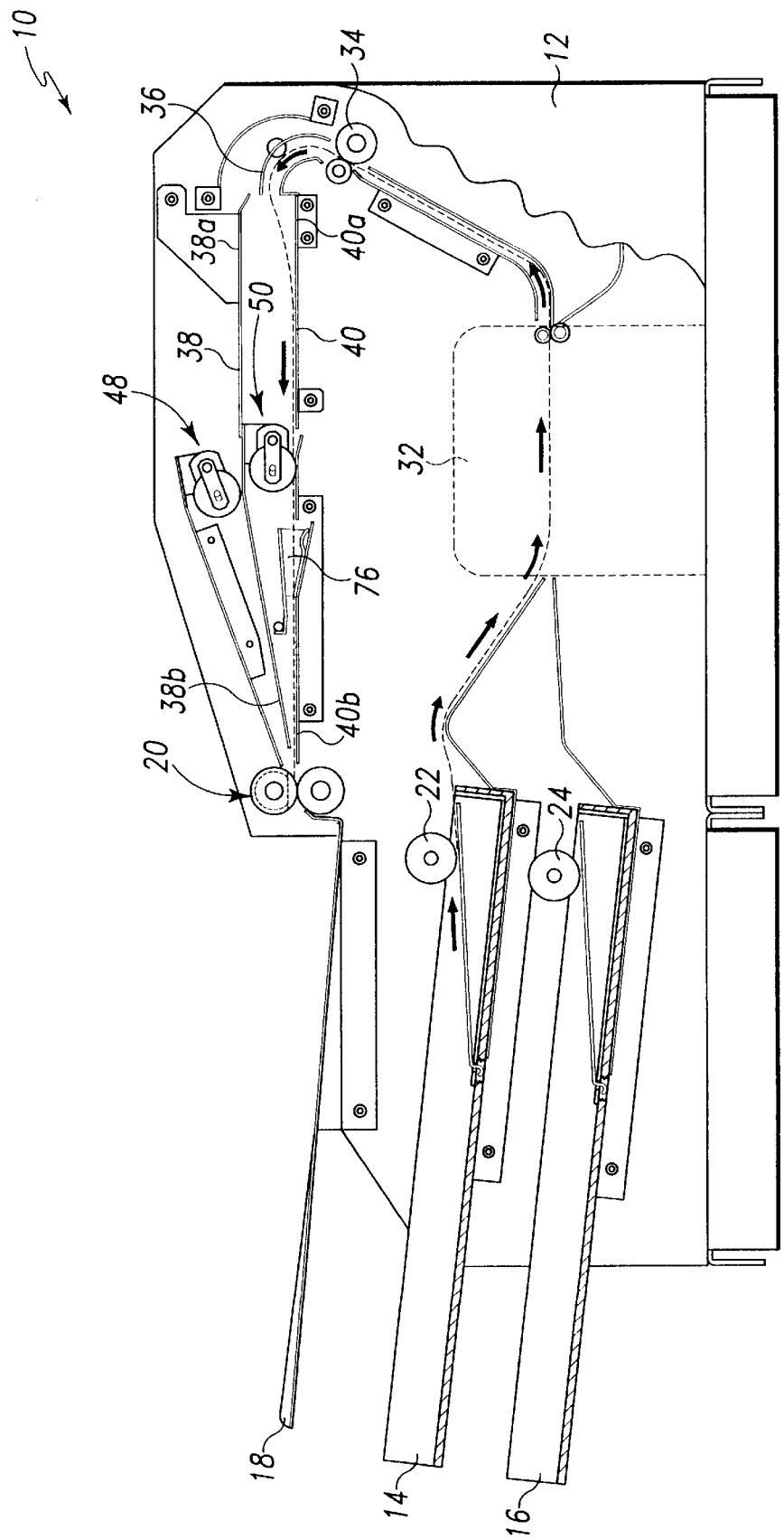
FIG. 6 is a view similar to FIG. 4, but showing a third paper path of travel.

The upper plate 38 has an upstream portion 38a and a downstream portion 38b (see FIGS. 4–6). After being diverted by the diverter 36, the back enclosure sheet $ES_{BACK}$ is advanced onto the upstream portion 38a in order to be advanced into contact with the scuffer assembly 48. The back enclosure sheet $ES_{BACK}$ is thereafter advanced by the scuffer assembly 48 along the downstream portion 38b and into the sealing station 20. More specifically, the downstream portion 38b of the upper plate 38 is downwardly inclined such that when one of the back enclosure sheets $ES_{BACK}$ is advanced thereon, a leading edge portion 131 (see FIG. 7) of the back enclosure sheet $ES_{BACK}$ is advanced downwardly and into the sealing station 20.

Figure 8:
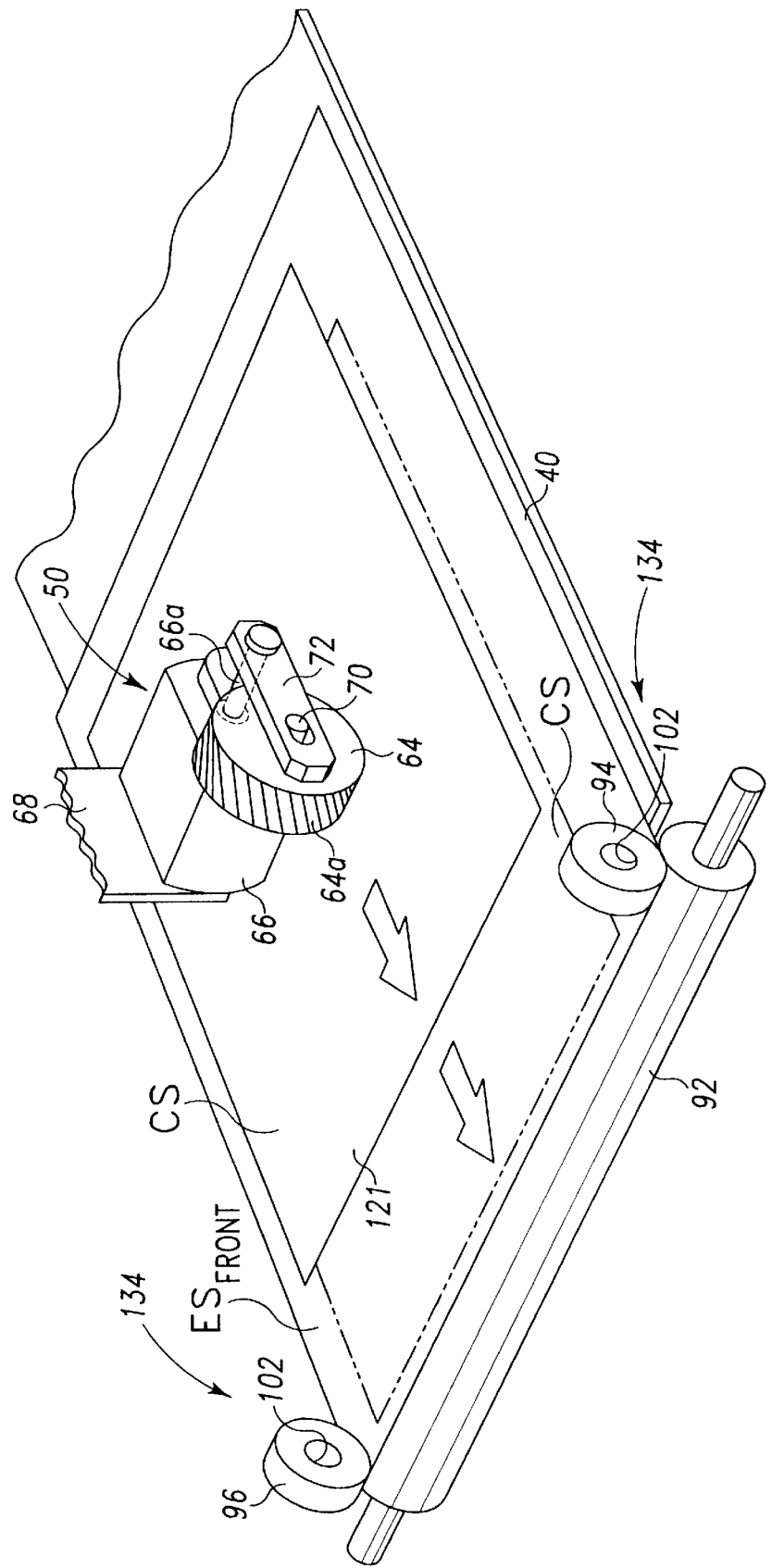
FIG. 8 is a perspective view showing the relationship between the lower plate 40, the scuffer assembly 50, the lateral edge rollers 94 and 96, and the support roller 92 of the document security apparatus of FIG. 1.

The scuffer assembly 50 is provided to advance the enclosure sheets ES and the confidential sheets CS along the lower plate 40. As shown in FIGS. 8 and 9, the scuffer assembly 50 includes an advancing or scuffer wheel 64. The scuffer wheel 64 is driven by a scuffer drive motor 66. The scuffer drive motor 66 includes an output shaft 66a. As with the scuffer drive motor 54, the scuffer drive motor 66 is preferably embodied as a known stepper motor. Hence, the output shaft 66a is rotated a predetermined distance each time the scuffer drive motor 66 receives an electrical impulse. Moreover, the output shaft 66a contacts an outer circumferential surface 64a of the scuffer wheel 64 in order to drive the scuffer wheel 64. More specifically, as the output shaft 66a is rotated in the general direction of arrow A of FIG. 9, the scuffer wheel 64 is driven in the general direction of arrow B of FIG. 9. The scuffer wheel 64 is driven in short pulses in order to constantly nudge the enclosure sheet ES and the confidential sheets CS along the lower plate 40 in a forward path of movement as indicated by arrow N of FIG. 9.

The scuffer assembly 50 is secured to the housing 12 via the upper plate 38. More specifically, the scuffer drive motor 66 has a first portion of a mounting plate 68 secured thereto. As shown in FIG. 9, a second portion of the mounting plate 68 is secured to a bottom side of the upper plate 38 thereby securing the scuffer assembly 50 to the upper plate 38 and hence the housing 12. The scuffer wheel 64 is rotatably coupled to a scuffer axle 70 which is in turn non-rotatably coupled to a first end of a support arm 72. The output shaft 66a of the scuffer drive motor 66 is rotatably coupled to a second end of the support arm 72 thereby allowing the scuffer assembly 72 to compensate for the height of the various confidential sheets CS and enclosure sheets ES advancing thereunder. More specifically, as the enclosure sheet ES, and thereafter the confidential sheets CS, are advanced between the scuffer wheel 64 and the lower plate 40, the first end of the support arm 72 rotates in the general direction of arrow C of FIG. 9 thereby causing the scuffer wheel 64 to be likewise urged in the general direction of arrow C of FIG. 9.

It should be appreciated that the scuffer assemblies 48, 50 may be modified in order to reduce the number of components associated with the document security apparatus 10. For example, the scuffer wheels 52, 64 may both be belt driven from a common drive motor thereby eliminating the need for separate drive motors (i.e. the scuffer drive motors 54, 66).

The lower plate 40 has an upstream portion 40a and a downstream portion 40b (see FIGS. 4–6). After being diverted by the diverter 36, the enclosure sheets ES, and thereafter the confidential sheets CS, are advanced onto the upstream portion 40a in order to be advanced into contact with the scuffer assembly 50. The enclosure sheets ES and the confidential sheets CS are thereafter advanced by the scuffer assembly 50 along the downstream portion 40b and toward the sealing station 20. More specifically, the downstream portion 40b of the lower plate 40 is configured such that when one of the enclosure sheets ES, or one of the confidential sheets CS is advanced thereon, a leading edge portion 131 (see FIG. 7) of the enclosure sheet ES, or a leading edge portion 121 of the confidential sheet CS is advanced toward the sealing station 20.

Figure 10:
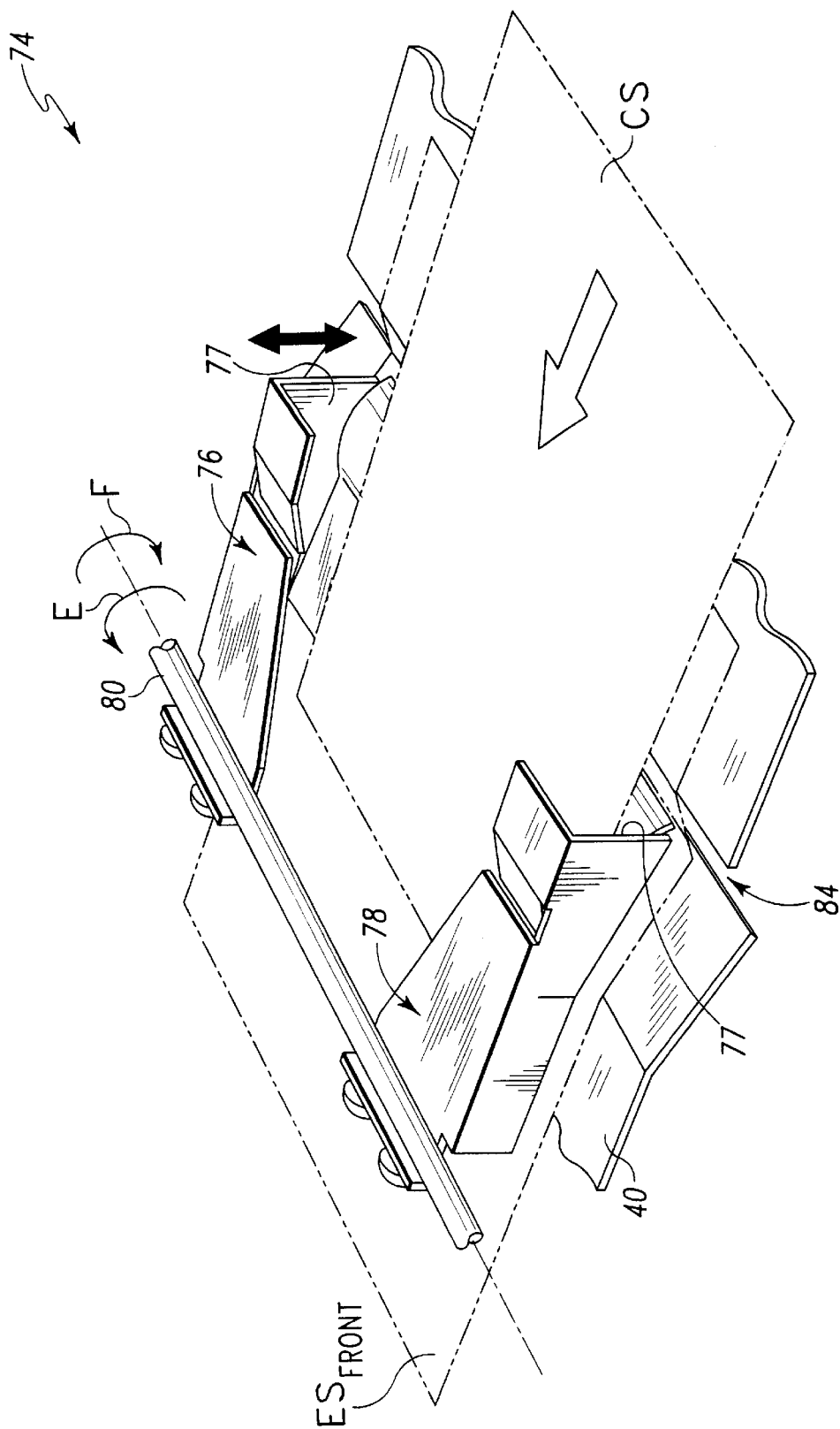
FIG. 10 is a perspective view of the sheet guiding assembly 74 of the document security apparatus of FIG. 1.

As shown in FIGS. 10–12, the document security apparatus 10 further includes a sheet guiding assembly 74. The sheet guiding assembly 74 includes a pair of deflector arms 76, 78. The deflector arms 76, 78 are coupled to a shaft 80. The shaft 80 is rotatable in the general directions of arrows E and F of FIG. 10 thereby permitting the deflector arms 76, 78 to be positioned in a raised deflector position as shown in FIG. 11, and a lowered deflector position as shown in FIG. 12. Each of the deflector arms 76, 78 includes a lower guide member 82. Each of the lower guide members 82 is received into a deflecting recess 84 defined in the lower plate 40 when the deflector arms 76, 78 are positioned in the lowered deflector position as shown in FIG. 12. Moreover, each of the deflector arms 76, 78 has an upper guide member 85 secured thereto. The upper guide members 85 and the lower guide members 82 define a sheet advancing slot 87 into which the confidential sheets CS are advanced (see FIG. 12).

The shaft 80 is mechanically coupled to a deflecting solenoid 86 (see FIG. 3). The deflecting solenoid 86 provides the operative power necessary to rotate the shaft 80 in the general directions of arrows E and F of FIG. 10. Hence, actuation of the deflecting solenoid 86 selectively moves the deflector arms 76, 78 in the general direction of arrow K so as to be positioned in the raised deflector position (see FIG. 11), or in the general direction of arrow L so as to be positioned in the lowered deflector position (see FIG. 12).

The deflector arms 76, 78 are positionable to allow the front enclosure sheet $ES_{FRONT}$ to be advanced into the sealing station 20. More specifically, when the deflecting solenoid 86 is actuated such that the deflector arms 76, 78 are positioned in the raised deflector position (see FIG. 11), the front enclosure sheet $ES_{FRONT}$ may be advanced under the deflector arms 76, 78 and into the sealing station 20. Moreover, the deflector arms 76, 78 are positionable to allow the confidential sheets CS to be advanced toward the sealing station 20. In particular, as shown in FIG. 12, when the deflecting solenoid 86 is actuated such that the deflector arms 76, 78 are positioned in the lowered deflector position, the confidential sheets CS may be advanced between the upper guide members 85 and the lower guide members 82 of the deflector arms 76, 78 and toward the sealing station 20. In addition, when the deflector arms 76, 78 are positioned in the lowered deflector position, the deflector arms 76, 78 cooperate to align the confidential sheets CS therebetween. In particular, as the confidential sheets CS are advanced between the deflector arm 76 and the deflector arm 78, an aligning surface 77 (see FIG. 10) defined in each of the deflector arms 76, 78 prevents lateral movement of the confidential sheets CS thereby preventing the confidential sheets CS from contacting adhesive sections disposed on the lateral edge portions (see discussion below in regard to FIGS. 7A–7D) of the enclosure sheets ES.

Figure 13:
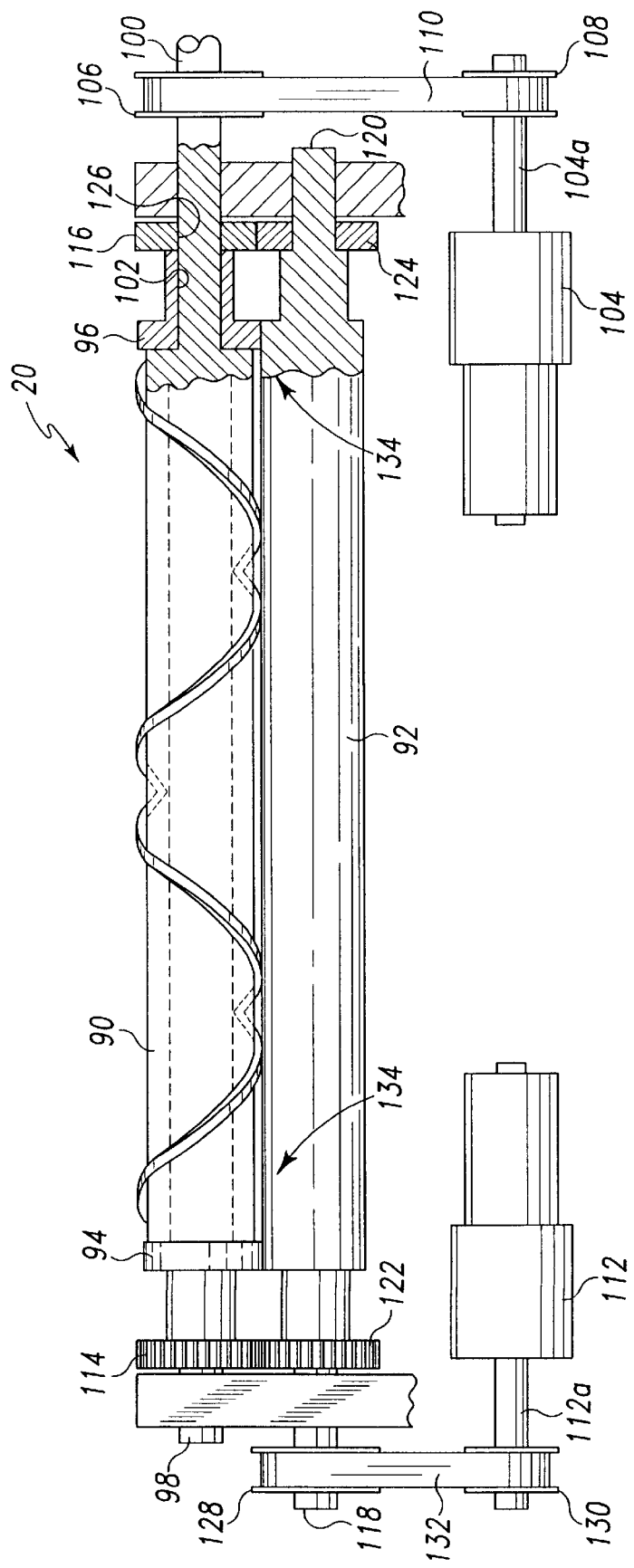
FIG. 13 is a partial cross sectional view showing a sealing assembly of the sealing station of the document security apparatus of FIG. 1.

As shown in FIG. 13, the sealing or envelope forming station 20 includes a D-shaped center or sealing roller 90, a support roller 92, and a pair of lateral edge sealers or rollers 94, 96. The sealing roller 90 includes a pair of end portions 98, 100 non-rotatably secured thereto. The lateral edge rollers 94, 96 are rotatably supported on the end portions 98, 100, respectively. More specifically, each of the lateral edge rollers 94, 96 has an aperture 102 defined therein. The end portions 98, 100 are received into the apertures 102 of the lateral edge rollers 94, 96 thereby permitting the lateral edge rollers 94, 96 to rotate independently or freely of the end portions 98, 100.

The sealing roller 90 is driven by a roller drive motor 104. In particular, a belt wheel 106 is non-rotatably coupled to the end portion 100. The belt wheel 106 is operatively coupled to the roller drive motor 104. More specifically, a belt wheel 108 is secured to an output shaft 104a of the roller drive motor 104. The belt wheel 106 is coupled to the belt wheel 108 via a belt 110. Hence, rotation of the output shaft 104a causes the belt 110 to be driven thereby causing the belt wheel 106 and hence the sealing roller 90 to be driven. The roller drive motor 104 is a bi-directional roller drive motor. Therefore, the roller drive motor 104 may be operated such that the sealing roller 90 is driven in either the clockwise or the counterclockwise direction.

Each of the lateral edge rollers 94, 96 has an edge roller gear 114, 116, respectively, non-rotatably secured thereto. Similar to the lateral edge rollers 94, 96, each of the edge roller gears 114, 116 has an aperture 126 defined therein. The end portions 98, 100 of the sealing roller 90 are received into the apertures 126 of the edge roller gears 114, 116, respectively, thereby permitting the edge roller gears 114, 116 to rotate independently of the end portions 98, 100 of the sealing roller 90. It should be appreciated that the edge roller gears 114, 116 and the lateral edge rollers 94, 96, respectively, may be embodied as separate components in which the edge roller gears 114, 116 are fastened (e.g. welded) to the lateral edge rollers 94, 96, respectively. Alternatively, it should be appreciated that the lateral edge rollers 94, 96 and the edge roller gears 114, 116, respectively, may be milled or otherwise machined from a single work piece thereby defining a single, integral part.

A pair of end portions 118, 120 defined in the support roller 92 each has a support roller gear 122, 124, respectively, non-rotatably coupled thereto. The support roller gears 122, 124 are meshingly engaged with the edge roller gears 114, 116, respectively. Moreover, the support roller gears 122, 124 and the edge roller gears 114, 116 have a 1:1 gear ratio. Therefore, rotation of a predetermined magnitude of the support roller 92 and hence the support roller gears 122, 124 causes rotation of the same magnitude on the edge roller gears 114, 116 and hence the lateral edge rollers 94, 96.

The support roller 92 and the lateral edge rollers 94, 96 are driven by a roller drive motor 112. In particular, a belt wheel 128 is non-rotatably coupled to the end portion 118. The belt wheel 128 is operatively coupled to the roller drive motor 112. In particular, a belt wheel 130 is secured to an output shaft 112a of the roller drive motor 112. The belt wheel 130 is coupled to the belt wheel 128 via a belt 132. Hence, rotation of the output shaft 112a causes the belt 132 to be driven thereby causing the belt wheel 128, the support roller 92, and hence the support roller gears 122, 124 to be driven. As the support roller gears 122, 124 are driven, the edge roller gears 114, 116 are also driven thereby causing rotation of the lateral edge rollers 94, 96.

It should be appreciated that the support roller 92 and the lateral edge rollers 94, 96 cooperate in order to define a nip roller assembly 134. More specifically, a line of contact between the support roller 92 and the lateral edge rollers 94, 96 defines a pinch line or nip which is provided to advance the front enclosure sheet $ES_{FRONT}$, the back enclosure sheet $ES_{BACK}$, and the confidential sheets CS therebetween. Collectively, the feeding rollers 22 and 24 (see FIGS. 4–6), the advancing roller 34 (see FIGS. 4–6), the scuffer assemblies 48 and 50 (see FIG. 9), and the nip roller assembly 134 function as a sheet advancing system of the document security apparatus 10.

As shown in FIGS. 7A and 7B, the enclosure sheets ES include a front side 127 and a back side 129. Moreover, each of the enclosure sheets ES includes a leading edge portion 131, and a trailing edge portion 133. It should be appreciated that the leading edge portion 131 of the enclosure sheet ES is the portion of the enclosure sheet ES which is first advanced into the sealing station 20 as the enclosure sheet ES is advanced through the document security apparatus 10. Conversely, the trailing edge portion 133 of the enclosure sheet ES is the portion of the enclosure sheet ES which is last advanced into the sealing station 20 as the enclosure sheet ES is advanced through the document security apparatus 10.

The enclosure sheet ES also includes a left lateral edge portion 135 and a right lateral edge portion 137, as shown in FIGS. 7A and 7B. It should be appreciated that the left lateral edge portion 135 of the enclosure sheet ES is the portion of the enclosure sheet ES which is advanced between, and therefore sealed by, the left lateral edge roller 94 and the support roller 92. Conversely, the right lateral edge portion 137 of the enclosure sheet ES is the portion of the enclosure sheet ES which is advanced between, and therefore sealed by, the right lateral edge roller 96 and the support roller 92.

The enclosure sheets ES are non-transparent in 5 order to conceal the confidential sheets CS from view. What is meant herein by the term "non-transparent" is that printed information on the confidential sheets CS, when the confidential sheets CS are positioned or otherwise enclosed between two of the enclosure sheets ES, is not readily legible or decipherable through the enclosure sheets ES. In order to further enhance confidentiality, the back side 129 of the enclosure sheets ES has a preprinted pattern 123 thereon, as shown in FIG. 7B. The preprinted pattern 123 enhances the non-transparent characteristics of the enclosure sheet ES. It should be appreciated that the preprinted pattern 123 is not printed by the print engine 32, but rather is printed on the back side 129 of the enclosure sheets ES prior to loading the enclosure sheets ES into the lower input tray 16. For example, the preprinted pattern may be printed onto the back side 129 of the enclosure sheets ES by a supplier or vendor of the enclosure sheets ES. In addition, although the printed pattern 123 is shown as a repetition of the word "CONFIDENTIAL", any word, phrase, logo, or other type of image may be used as the printed pattern 123. For example, the printed pattern 123 may include the corporate name and/or logo associated with the office in which the document security apparatus 10 is being operated. It should be further appreciated that the non-transparent enclosure sheets ES may be completely devoid of any preprinted pattern 123 thereon, and thus simply the type and thickness of the paper itself renders the enclosure sheets ES non-transparent. For example, white sheets of paper, of the type and thickness that is normally used in a plain paper facsimile machine or photocopier, (e.g. item number 4024 DP paper available from Xerox Corporation) may be used as the non-transparent enclosure sheet ES assuming this type of sheet possessed the appropriate size, and adhesive material positioned around its periphery as will be discussed below.

In particular, the front side 127 of the enclosure sheet ES includes a number of pressure-sensitive adhesive sections 136, whereas the back side 129 of the enclosure sheets ES includes a number of pressure-sensitive adhesive sections 138. The adhesive sections 136 do not overlap with the adhesive sections 138 in order to prevent adjacent enclosure sheets ES from sticking to one another when the enclosure sheets ES are positioned on top of one another in the lower input tray 16. What is meant herein by the phrase "do not overlap" is that when two enclosure sheets ES are stacked one on top of the other with (1) the respective front sides 127 thereof facing upwardly, and (2) the respective leading edge portions 131 thereof aligned, the adhesive sections 138 on the back side of the enclosure sheet ES that is positioned on top does not contact the adhesive sections 136 on the front side 127 of the enclosure sheet ES that is positioned on bottom.

Moreover, each of the enclosure sheets ES includes a pair of perforated tear strips 147. Once the enclosure sheets ES have been sealed together with a number of confidential sheets CS therebetween, the tear strips 147 may later be removed in order to allow the confidential sheets CS sealed within the enclosure sheets ES to be removed.

As shown in FIG. 14A, the sealing roller or sealer 90 is substantially D-shaped having a flat side 90a and a curved side 90b. A sealing ridge 140 is attached to the curved side 90b of the sealing roller 90. The sealing ridge 140 continuously extends from a first end 95 of the sealing roller 90 to a second end 97 of the sealing roller 90. As shown in FIG. 14A, the sealing ridge includes a number of substantially V-shaped sections 140a. The sealing ridge 140 is provided to pinch or otherwise urge the adhesive sections 136 of the back enclosure sheet $ES_{BACK}$ into contact with the adhesive sections 138 of the front enclosure sheet $ES_{FRONT}$. In particular, the support roller 92 defines a support surface onto which the front enclosure sheet $ES_{FRONT}$ and the back enclosure sheet $ES_{BACK}$ may be positioned for subsequent sealing thereof by rotating the sealing roller 90 such that the front enclosure sheet $ES_{FRONT}$ and the back enclosure sheet $ES_{BACK}$ are sandwiched between the sealing ridge 140 and the support roller 92.

Figure 21:
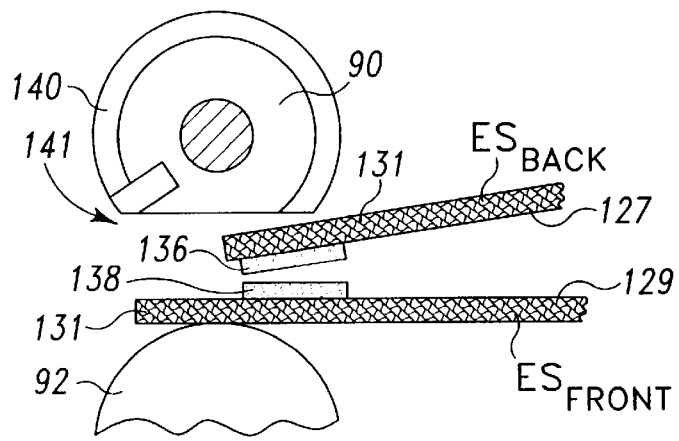
FIG. 21 is a partial cross sectional view showing the front enclosure sheet $ES_{FRONT}$ and the back enclosure sheet $ES_{BACK}$ being advanced through the sheet advancing gap 141 of the sealing roller 90 of FIG. 13.
Figure 22:
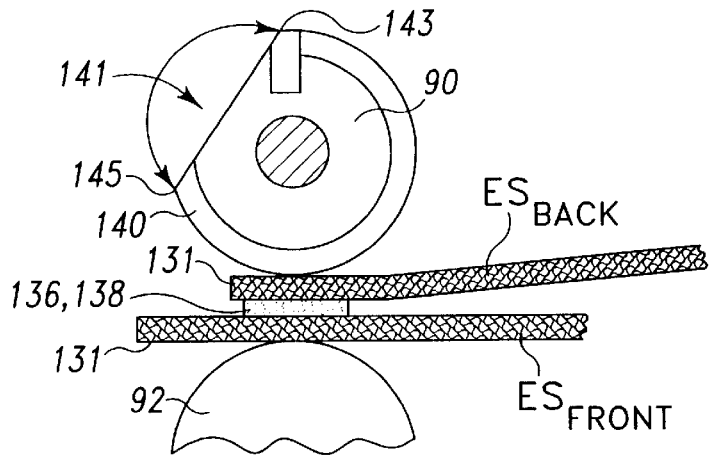
FIG. 22 is a view similar to FIG. 21, but showing the front enclosure sheet $ES_{FRONT}$ being sealed to the back enclosure sheet $ES_{BACK}$ by the sealing roller 90.

When the leading edge portion 131 of the back enclosure sheet $ES_{BACK}$ and the leading edge portion 131 of the front enclosure sheet $ES_{FRONT}$ are to be advanced to a positioned between the sealing roller 90 and the support roller 92 (see FIG. 21), the sealing roller 90 is positioned such that the sealing ridge 140 is spaced apart from the support roller 92. More specifically, the sealing roller 90 and the sealing ridge 140 define a sheet advancement gap 141, as shown in FIG. 22. The sheet advancement gap 141 is defined as the area juxtaposed to the sealing roller 90 between an upper ridge point 143 and a lower ridge point 145 (see FIG. 22). Hence, the leading edge portion 131 of the back enclosure sheet $ES_{BACK}$ and the leading edge portion 131 of the front enclosure sheet $ES_{FRONT}$ are advanced through the sheet advancement gap 141 and into the nip of the nip roller assembly 134 in order to be positioned between the sealing roller 90 and the support roller 92.

Once advanced by the nip roller assembly 134 to a predetermined position between the sealing roller 90 and the support roller 92, the back enclosure sheet $ES_{BACK}$ and the front enclosure sheet $ES_{FRONT}$ are held stationary within the nip (see FIG. 9). In particular, the support roller 92 is held stationary so as to prevent movement of the back enclosure sheet $ES_{BACK}$ and the front enclosure sheet $ES_{FRONT}$ relative to the upper plate 38 and the lower plate 40 of the bail system 41. While the front enclosure sheet $ES_{FRONT}$ and the back enclosure sheet $ES_{BACK}$ are both held stationary within the nip, the sealing roller 90 is rotated such that the sealing ridge 140 is positioned in "operative contact" with the support roller 92 thereby urging the adhesive sections 136 within the leading edge portion 131 of the back enclosure sheet $ES_{BACK}$ downwardly and into contact with the adhesive sections 138 within the leading edge portion 131 of the front enclosure sheet $ES_{FRONT}$ (see FIG. 22) thereby sealing the leading edge portion 131 of the back enclosure sheet $ES_{BACK}$ to the leading edge portion 131 of the front enclosure sheet $ES_{FRONT}$ so as to define an envelope 91 having an access opening 93 defined therein (see FIG. 31). In order to provide meaning to the term "operative contact", it should be noted that a first member (e.g. the sealing ridge 140, the left lateral sealing roller 94, etc.) is in operative contact with a second member (e.g. the support roller 92) when the first member cooperates with the second member so as to cause the adhesive sections 136 of the back enclosure sheet $ES_{BACK}$ to be urged downwardly and into contact with the adhesive sections 138 of the front enclosure sheet $ES_{FRONT}$ so as to form a seal therebetween.

It should be appreciated that although the preferred embodiment is configured so as to hold the support roller 92 stationary during rotation of the sealing roller 90, with minor modifications of the document security apparatus 10 (as described in more detail below), effective sealing may be achieved by rotating the support roller 92 concurrently with rotation of the sealing roller 90 so as to produce relative slip therebetween. What is meant herein by the term "relative slip" is that the sealing roller 90 is being rotated at a faster (or slower) speed than the support roller 92 such that pressure is applied along a lateral sealing line (i.e. a line which is perpendicular to the path of movement of the enclosure sheets ES) while the front enclosure sheet $ES_{FRONT}$ and the back enclosure sheet $ES_{BACK}$ are held stationary. For example, if the support roller 92 is being rotated at a speed of X revolutions-per-minute, relative slip will be achieved therebetween if the sealing roller 90 is rotated at a speed of 3× revolutions-per-minute. It should be appreciated that modification would need to be made to the sealing station 20 in order to operate the sealing roller 90 and the support roller 92 in such a manner. For example, a separate clamping or holding device (not shown) may need to be provided to hold both the front enclosure sheet $ES_{FRONT}$ and the back enclosure sheet $ES_{BACK}$ stationary relative to the upper plate 38 and the lower plate 40 of the bail system 41 as the sealing roller 90 and the support roller 92 are operated to produce relative slip therebetween.

Figure 23:
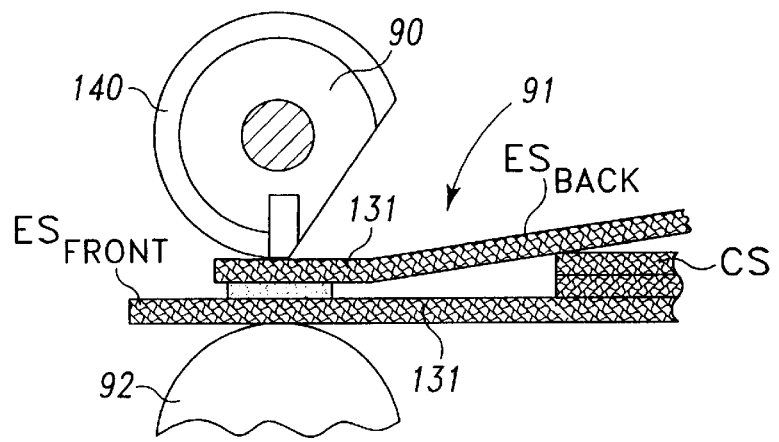
FIG. 23 is a view similar to FIG. 22, but showing the position of the sealing roller 90 during advancement of the confidential sheets CS into the envelope 91.

After sealing the leading edge portions 131 of the enclosure sheets ES, rotation of the sealing roller 90 is then ceased such that the sealing ridge 140 is held in operative contact with the support roller 92 thereby sandwiching the leading edge portion 131 of the back enclosure sheet $ES_{BACK}$ and the leading edge portion 131 of the front enclosure sheet $ES_{FRONT}$ between the sealing roller 90 and the support roller 92 (see FIG. 23). The confidential sheets CS may then be advanced into the envelope 91.

Figure 24:
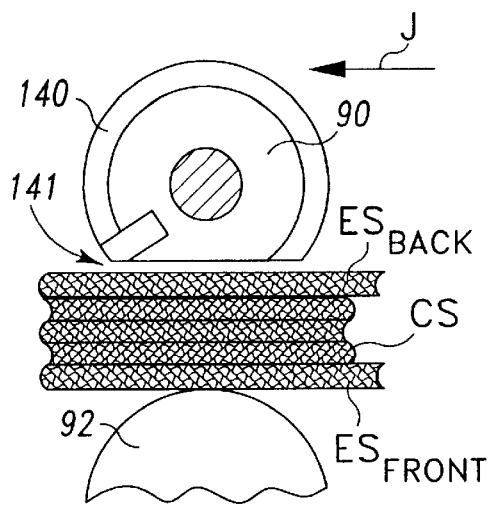
FIG. 24 is a view similar to FIG. 23, but showing the sealing roller 90 positioned in order to allow the front enclosure sheet $ES_{FRONT}$, the back enclosure sheet $ES_{BACK}$, and the confidential sheets CS therebetween to be advanced through the sheet advancing gap 141 of the sealing roller 90.

After the last confidential sheet is advanced into the envelope 91, the sealing roller 90 is then rotated to complete its sealing operation thereby resulting in the sealing roller 90 being rotated back to its original position (see FIG. 24) so that the back enclosure sheet $ES_{BACK}$ and the front enclosure sheet $ES_{FRONT}$, along with the confidential sheets CS therebetween, may be advanced through the sheet advancement gap 141 in the general direction of arrow J of FIG. 24. It should be appreciated that as the back enclosure sheet $ES_{BACK}$, the front enclosure sheet $ES_{FRONT}$, and the confidential sheets CS are advanced in the general direction of arrow J, the left lateral edge portion 135 of the back enclosure sheet $ES_{BACK}$ is sealed to the left lateral edge portion 135 of the front enclosure sheet $ES_{FRONT}$ as the left lateral edge portions 135 are advanced between the left lateral edge sealing roller 94 and the support roller 92. Moreover, as the back enclosure sheet $ES_{BACK}$, the front enclosure sheet $ES_{FRONT}$, and the confidential sheets CS are advanced in the general direction of arrow J, the right lateral edge portion 137 of the back enclosure sheet $ES_{BACK}$ is sealed to the right lateral edge portion 137 of the front enclosure sheet $ES_{FRONT}$ as the right lateral edge portions 137 are advanced between the right lateral edge sealing roller 96 and the support roller 92.

Figure 25:
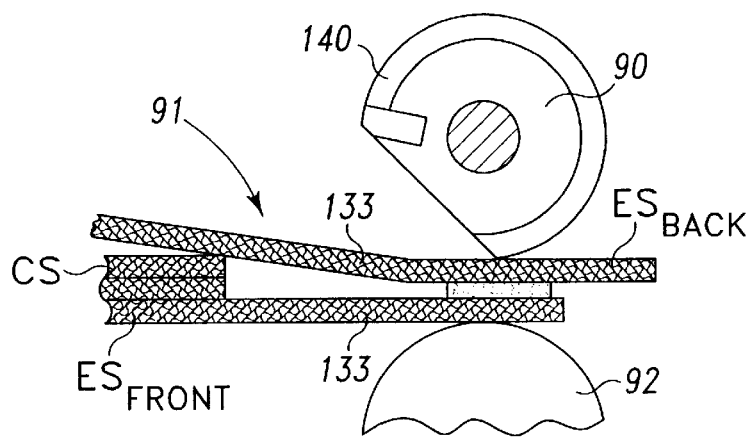
FIG. 25 is a view similar to FIG. 24, but showing the relationship between the sealing roller 90 and the support roller 92 as the sealing roller 90 begins to seal the trailing edge portions 133 of the front enclosure sheet $ES_{FRONT}$ and the back enclosure sheet $ES_{BACK}$ to one another.
Figure 26:
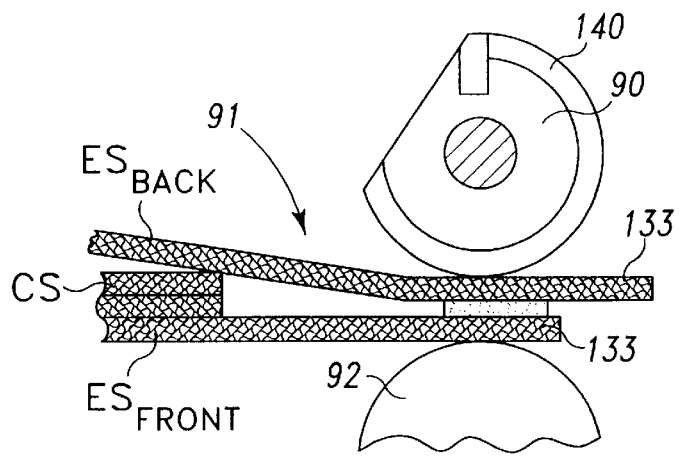
FIG. 26 is a view similar to FIG. 25, but showing the sealing roller 90 as it completes sealing the trailing edge portions 133.

The back enclosure sheet $ES_{BACK}$, the front nclosure sheet $ES_{FRONT}$, and the confidential sheets CS continue to be advanced until the trailing edge portion 133 of the back enclosure sheet $ES_{BACK}$ and the trailing edge portion 133 of the front enclosure sheet $ES_{FRONT}$ are positioned between the sealing roller 90 and the support roller 92 (see FIGS. 25 and 26). Advancement is then halted and the back enclosure sheet $ES_{BACK}$ and the front enclosure sheet $ES_{FRONT}$ are held stationary within the nip of the nip roller assembly 134. Thereafter, the sealing roller 90 may be rotated such that the sealing ridge 140 is positioned in operative contact with the support roller 92 thereby urging the adhesive sections 136 of the back enclosure sheet $ES_{BACK}$ into contact with the adhesive sections 138 of the front enclosure sheet $ES_{FRONT}$ (see FIG. 26) thereby sealing the trailing edge portion 133 of the back enclosure sheet $ES_{BACK}$ to the trailing edge portion 133 of the front enclosure sheet $ES_{FRONT}$. Collectively, the sealed enclosure sheets ES and the confidential sheets CS therebetween are referred to as a sealed confidential packet CP, as shown in FIG. 7D. After sealing the trailing edge portion 133 of the back enclosure sheet $ES_{BACK}$ to the trailing edge portion 133 of the front enclosure sheet $ES_{FRONT}$, the sealed confidential packet CP is advanced by the nip roller assembly 134 out of the sealing station 20 and into the output tray 18 (see FIG. 1).

Figure 15B:
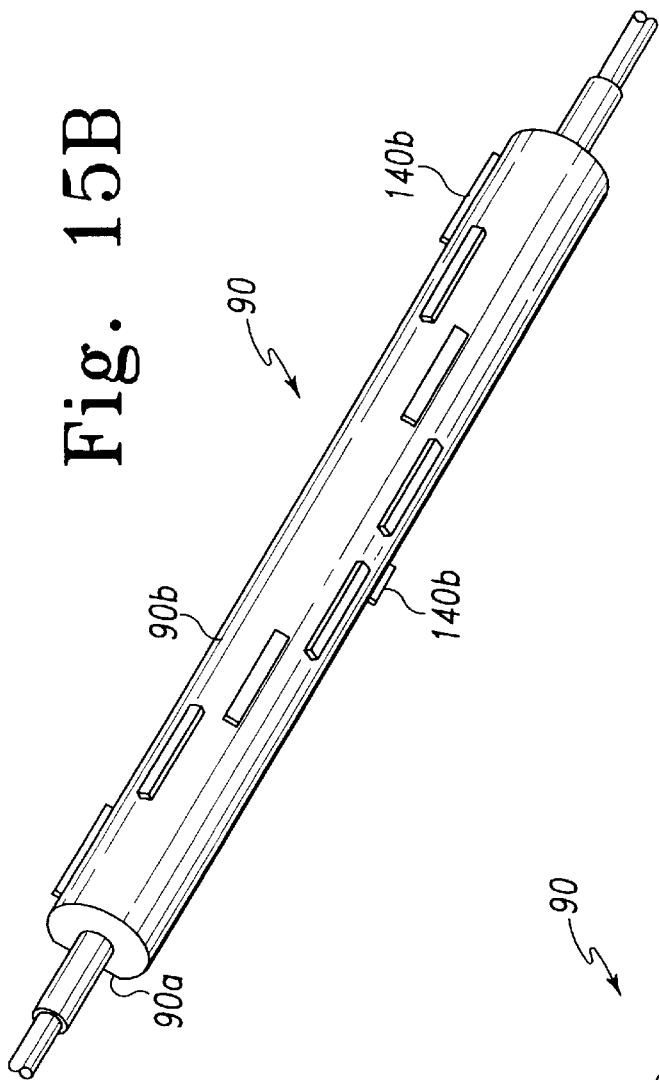
FIG. 15B is a view similar to FIG. 14A, but showing a fourth embodiment of the sealing roller.
Figure 15A:
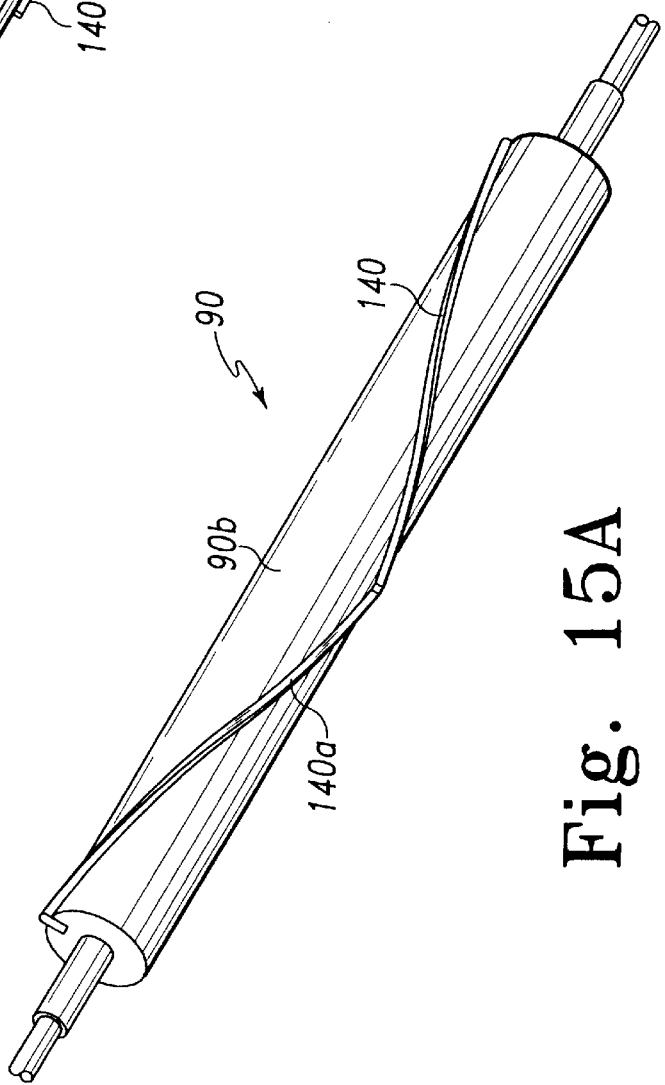
FIG. 15A is a view similar to FIG. 14A, but showing a third embodiment of the sealing roller.

Various configurations of the sealing roller 90 are contemplated for use in the sealing station 20 of the document security apparatus 10. For example, the number and placement of the V-shaped sections 140a may be altered, as shown in FIG. 15A, so that a single, large V-shaped sealing ridge 140 extends continuously across the entire length of the sealing roller 90. Alternatively, the sealing ridge 140 may take the form of two upside-down, generally V-shaped members which continuously extend across the entire length of the sealing roller 90, as shown in FIG. 16A. In addition, as shown in FIGS. 14B, 15B, and 16B, the sealing ridge 140 may alternatively be embodied as a series of sealing segments 140b positioned in predetermined positions along the curved side 90b of the sealing roller 90 as opposed to a single, continuous member. Such a configuration reduces the potential for wrinkling of the enclosure sheets ES during sealing thereof.

Figure 17:
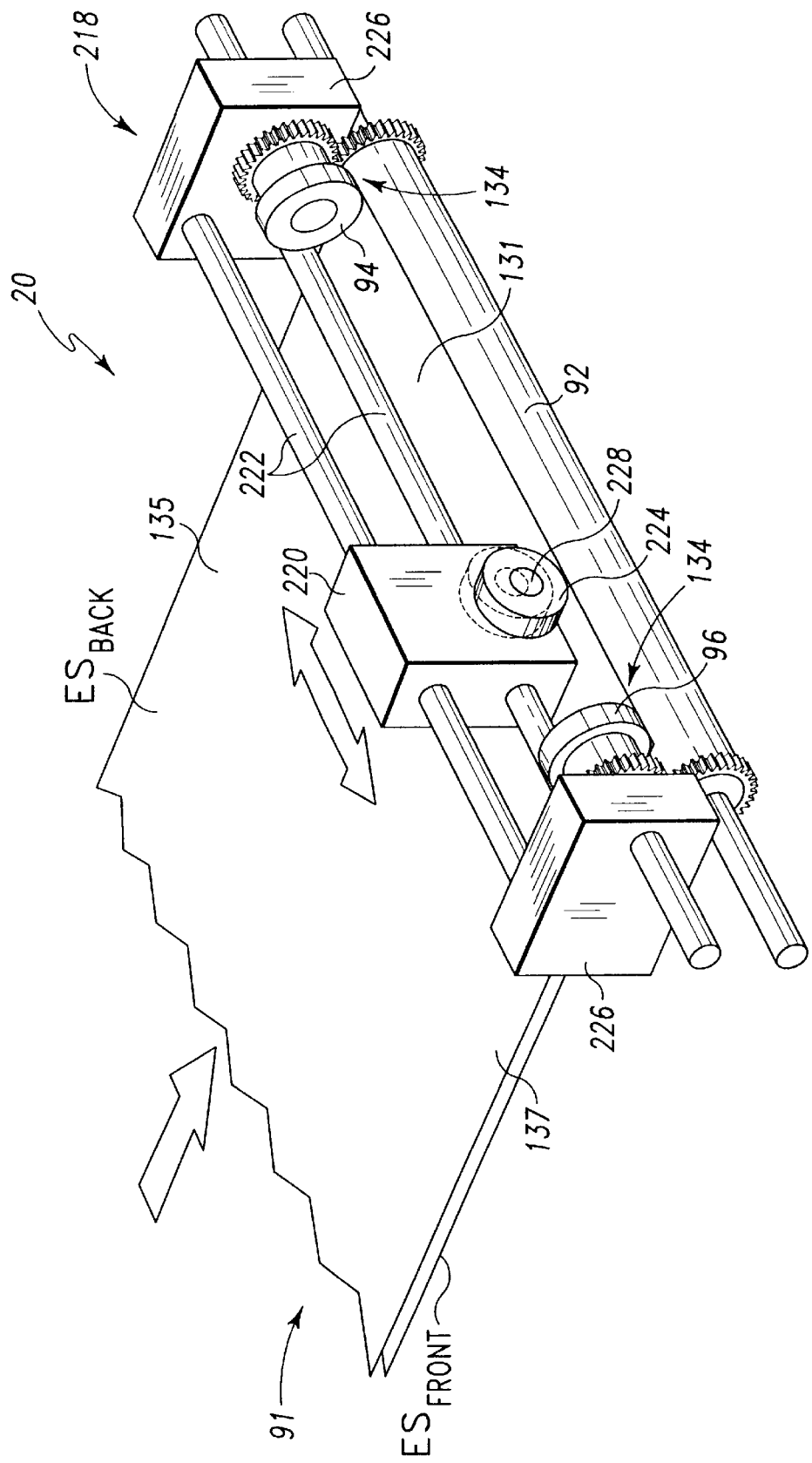
FIG. 17 is a perspective view of a lateral sealing assembly which may alternatively be used in the sealing station of the document security apparatus of FIG. 1.

Moreover, another embodiment of the sealing station 20 is shown in FIG. 17. In particular, the sealing station 20 may include a lateral sealing assembly 218. The lateral sealing assembly 218 includes a carriage 220, a pair of rails 222, a sealing member or roller 224, and a pair of rail supports 226. The rails 222 are secured to the rail supports 226. The carriage 220 is slidably supported on the rails 222 in order to allow the carriage 220 to slide or otherwise move along the rails 222 between the left lateral edge portion 135 of the enclosure sheets ES and the right lateral edge portion 137 of the enclosure sheets ES.

The carriage 220 includes a shaft 228. The sealing roller 224 is rotatably secured to the shaft 228. The shaft 228 is disposed substantially perpendicular to the support roller 92. Hence, the sealing roller 224 rotates about an axis which is substantially perpendicular to an axis about which the support roller 92 rotates. Moreover, the shaft 228 is secured to a solenoid (not shown) or similar device in order to allow the sealing roller 224 to be positioned between a raised position (as shown in phantom in FIG. 17) in which the sealing roller 224 is spaced apart from the support roller 92, and a lowered position in which the sealing roller 224 is biased toward and thereby operatively contacting the support roller 92. When the sealing roller 224 is positioned in the raised position, the front enclosure sheet $ES_{FRONT}$ and the back enclosure sheet $ES_{BACK}$ may be advanced through the nip of the nip roller assembly 134 such that the leading edge portions 131 thereof are positioned between the sealing roller 224 and the support roller 92. Thereafter, the sealing roller 224 may be positioned in its lowered position such that the leading edge portions 131 of the front enclosure sheet $ES_{FRONT}$ and the back enclosure sheet $ES_{BACK}$ are sandwiched between the sealing roller 224 and the support roller 92. The carriage 220 is then advanced on the rails 222 such that the sealing roller 224 is moved along the leading edge portions 131 of the front enclosure sheet $ES_{FRONT}$ and the back enclosure sheet $ES_{BACK}$. In particular, the sealing roller 224 moves between the left lateral edge portion 135 and the right lateral edge portion 137 of the leading edge portions 131 of the front enclosure sheet $ES_{FRONT}$ and the back enclosure sheet $ES_{BACK}$. When the above occurs, the adhesives 136 and 138 along the leading edge portions 131 of the front enclosure sheet $ES_{FRONT}$ and the back enclosure sheet $ES_{BACK}$ are urged into contact with each other thereby sealing the leading edge portions 131 of the front enclosure sheet $ES_{FRONT}$ and the back enclosure sheet $ES_{BACK}$ to one another so as to form the envelope 91.

Once the envelope 91 has been formed, the confidential sheets CS may be advanced into the envelope 91. It should be appreciated that the sealing roller 224 may remain in the lowered position while the confidential sheets CS are advanced into the envelope 91 in order to assist in holding the envelope 91 stationary.

After the last confidential sheet CS is advanced into the envelope 91, the sealing roller 224 is positioned in its raised position, and the front enclosure sheet $ES_{FRONT}$, the back enclosure sheet $ES_{BACK}$, and the confidential sheets CS therebetween are advanced by the nip roller assembly 134. As described above in regard to use of the sealing roller 92, when the front enclosure sheet $ES_{FRONT}$, the back enclosure sheet $ES_{BACK}$, and the confidential sheets CS therebetween are advanced through the nip of the nip roller assembly 134, the lateral edge portions 135, 137 of the front enclosure sheet $ES_{FRONT}$ and the back enclosure sheet $ES_{BACK}$ are sealed to one another as the lateral edge portions 135, 137 are advanced between the lateral edge rollers 94, 96 and the support roller 92, respectively.

Once the trailing edge portions 133 of the front enclosure sheet $ES_{FRONT}$ and the back enclosure sheet $ES_{BACK}$ are positioned between the sealing roller 224 and the support roller 92, advancement is halted, and the front enclosure sheet $ES_{FRONT}$ and the back enclosure sheet $ES_{BACK}$ are held stationary. The sealing roller 224 is then again positioned in its lowered position such that the trailing edge portions 133 of the front enclosure sheet $ES_{FRONT}$ and the back enclosure sheet $ES_{BACK}$ are sandwiched between the sealing roller 224 and the support roller 92. The carriage 220 is then advanced on the rails 222 such that the sealing roller 224 is moved along the trailing edge portions 133 of the front enclosure sheet $ES_{FRONT}$ and the back enclosure sheet $ES_{BACK}$. In particular, the sealing roller 224 moves between the left lateral edge portion 135 and the right lateral edge portion 137 of the front enclosure sheet $ES_{FRONT}$ and the back enclosure sheet $ES_{BACK}$ such that the adhesives 136 and 138 within the trailing edge portions 133 thereof are urged into contact with each other thereby sealing the trailing edge portions 133 of the front enclosure sheet $ES_{FRONT}$ and the back enclosure sheet $ES_{BACK}$ to one another so as to form the sealed confidential packet CP. The sealing roller 224 is then again positioned in the raised position, and the sealed confidential packet CP is then advanced by the nip roller assembly 134 out of the sealing station 20 and into the output tray 18.

Figure 18:
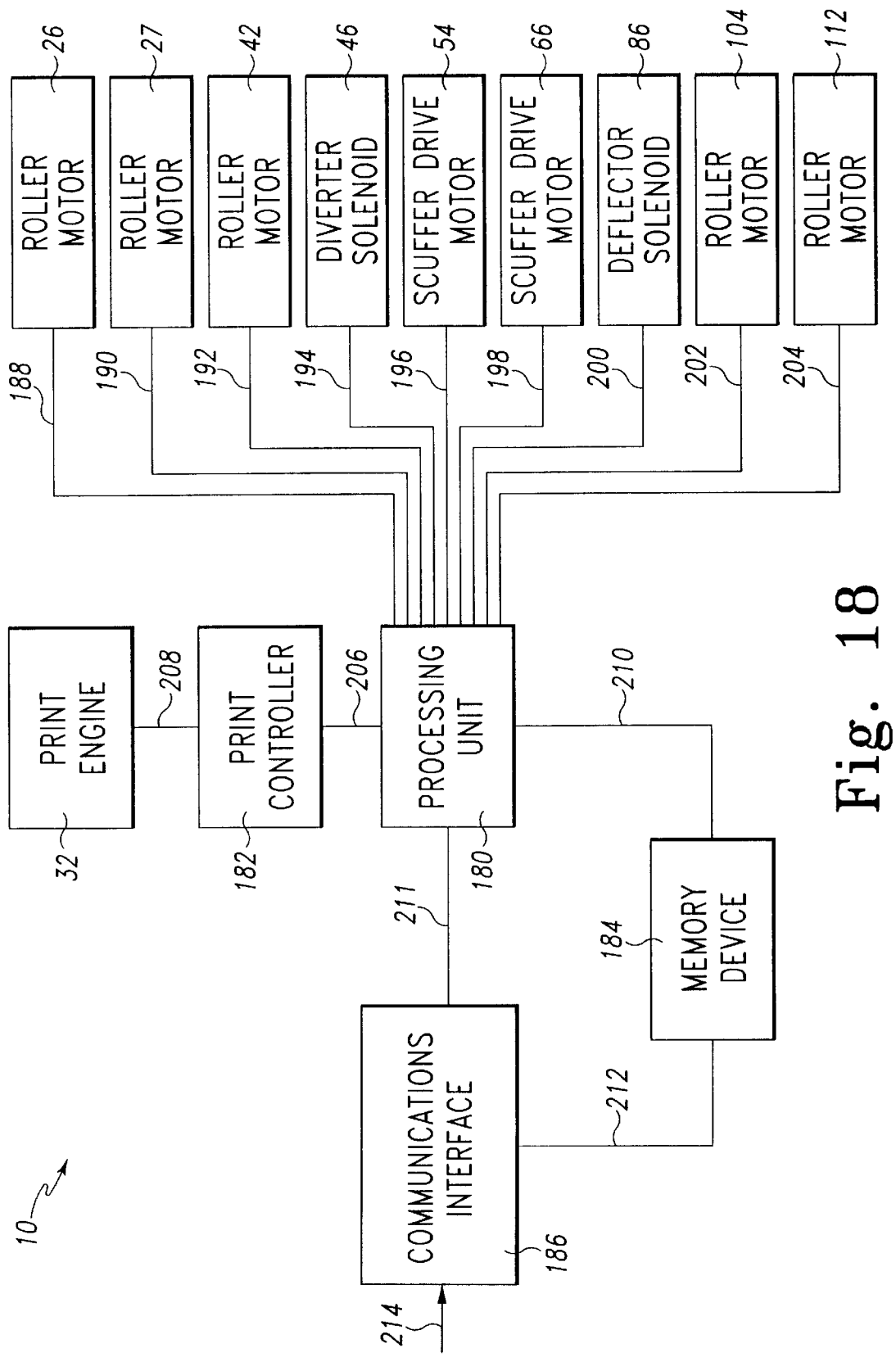
FIG. 18 is a simplified block diagram of the document security apparatus of FIG. 1.

Referring now to FIG. 18, there is shown a simplified block diagram of the document security apparatus 10. A processing unit 180 is electrically coupled to the roller drive motors 26, 27, 42, 104, and 112, the diverter solenoid 46, the scuffer drive motors 54 and 66, and the deflector solenoid 86. The processing unit is also electrically coupled to a communications interface 186 and a print controller 182. The print controller 182 is in turn electrically coupled to the print engine 32, whereas the communications interface 186 and the processing unit 180 are both electrically coupled to a memory device 184.

The processing unit 180 is electrically coupled to the roller drive motor 26 (see FIGS. 1 and 3) via a control line 188. The processing unit 180 selectively generates a control signal on the control line 188 which causes rotation of an output shaft of the roller drive motor 26. Rotation of the output shaft of the roller drive motor 26 causes the belt 28 (see FIGS. 1 and 3) to be advanced thereby causing the upper feeding roller 22 (see FIGS. 4–6) to be rotated. Hence, when the processing unit 180 generates a control signal on the control line 188, the feeding roller 22 is rotated thereby causing one of the confidential sheets CS to be advanced out of the upper input tray 14.

Similarly, the processing unit 180 is electrically coupled to the roller drive motor 27 (see FIGS. 2 and 3) via a control line 190. The processing unit 180 selectively generates a control signal on the control line 190 which causes rotation of an output shaft of the roller drive motor 27. Rotation of the output shaft of the roller drive motor 27 causes the belt 30 (see FIGS. 2 and 3) to be advanced thereby causing the lower feeding roller 24 (see FIGS. 4–6) to be rotated. Hence, when the processing unit 180 generates a control signal on the control line 190, the feeding roller 24 is rotated thereby causing one of the enclosure sheets ES to be advanced out of the lower input tray 16.

The processing unit 180 is electrically coupled to the roller drive motor 42 (see FIGS. 1 and 3) via a control line 192. The processing unit 180 selectively generates a control signal on the control line 192 which causes rotation of an output shaft of the roller drive motor 42. Rotation of the output shaft of the roller drive motor 42 causes the belt 44 (see FIGS. 1 and 3) to be advanced thereby causing the advancing roller 34 (see FIGS. 4–6) to be rotated. Hence, when the processing unit 180 generates a control signal on the control line 192, the advancing roller 34 is rotated thereby permitting one of the confidential sheets CS or one of the enclosure sheets ES to be advanced out of the print engine 32, through the diverter 36, and onto either the upper plate 38 or the lower plate 40.

The processing unit 180 is electrically coupled to the diverter solenoid 46 (see FIGS. 2 and 3) via a control line 194. The processing unit 180 selectively generates a control signal on the control line 194 which causes the diverter solenoid 46 to be actuated. Actuation of the diverter solenoid 46 causes the diverter 36 to be switched between the first diverter position (see FIGS. 4 and 6) and the second diverter position (see FIG. 5). Hence, when the processing unit 180 generates a control signal on the control line 194, the diverter 36 may be positioned in the first diverter position thereby causing the front enclosure sheet $ES_{FRONT}$ or one of the confidential sheets CS that is being advanced by the advancing roller 34 to be diverted onto the lower plate 40. Alternatively, when the processing unit 180 generates a control signal on the control line 194, the diverter 36 may be positioned in the second diverter position thereby causing the back enclosure sheet $ES_{BACK}$ that is being advanced by the advancing roller 34 to be diverted onto the upper plate 38.

The processing unit 180 is electrically coupled to the scuffer drive motor 54 (see FIG. 9) via a control line 196. The processing unit 180 selectively generates a control signal on the control line 196 which causes rotation of an output shaft 54a of the scuffer drive motor 54. As described above, the scuffer drive motor 54 is preferably embodied as a stepper motor. Hence, when the processing unit 180 generates a control signal on the control line 196, the output shaft 54a of the scuffer drive motor 54 is rotated a predetermined distance so as to cause the scuffer wheel 52 to likewise be rotated a predetermined distance. Therefore, when the processing unit 180 generates a stream of control signals on the control line 196, the scuffer wheel 52 is rotated in a pulsing manner such that the back enclosure sheet $ES_{BACK}$ is nudged along the upper plate 38 in order to continuously urge the leading edge portion 131 thereof into the nip of the nip roller assembly 134.

The processing unit 180 is electrically coupled to the scuffer drive motor 66 (see FIG. 9) via a control line 198. The processing unit 180 selectively generates a control signal on the control line 198 which causes rotation of an output shaft 66a of the scuffer drive motor 66. As described above, the scuffer drive motor 66 is preferably embodied as a stepper motor. Hence, when the processing unit 180 generates a control signal on the control line 198, the output shaft 66a of the scuffer drive motor 66 is rotated a predetermined distance so as to cause the scuffer wheel 64 to likewise be rotated a predetermined distance. Therefore, when the processing unit 180 generates a stream of control signals on the control line 198, the scuffer wheel 64 is rotated in a pulsing manner such that the front enclosure sheet $ES_{FRONT}$ is nudged along the lower plate 40 and under the deflector arms 76, 78 of the sheet guiding assembly 74 in order to continuously urge the leading edge portion 131 thereof into the nip of the nip roller assembly 134. Moreover, when the processing unit 180 generates a stream of control signals on the control line 198, the scuffer wheel 64 is rotated in a pulsing manner such that one of the confidential sheets CS is nudged along the front enclosure sheet $ES_{FRONT}$ positioned on the lower plate 40 and into the envelope 91 defined by the front enclosure sheet $ES_{FRONT}$ and the back enclosure sheet $ES_{BACK}$.

The processing unit 180 is electrically coupled to the deflector solenoid 86 (see FIGS. 2 and 3) via a control line 200. The processing unit 180 selectively generates a control signal on the control line 200 which causes the deflector solenoid 86 to be actuated. Actuation of the deflector solenoid 86 causes the deflector arms 76, 78 to be switched between the raised deflector position (see FIG. 11) and the lowered deflector position (see FIG. 12). Hence, when the processing unit 180 generates a control signal on the control line 200, the deflector arms 76, 78 may be positioned in the raised deflector position thereby permitting the front enclosure sheet $ES_{FRONT}$ to be advanced along the lower plate 40 under the deflector arms 76, 78, and into the nip of the nip roller assembly 134. Alternatively, when the processing unit 180 generates a control signal on the control line 200, the deflector arms 76, 78 may be positioned in the lowered deflector position thereby permitting the confidential sheets CS to be advanced between the upper guide members 85 and the lower guide members 82 (see FIG. 12) of the deflector arms 76, 78, and into the envelope 91 defined by the front enclosure sheet $ES_{FRONT}$ and the back enclosure sheet $ES_{BACK}$.

The processing unit 180 is electrically coupled to the bi-directional roller drive motor 104 (see FIG. 13) via a control line 202. The processing unit 180 selectively generates control signals on the control line 202 which cause rotation of the output shaft 104a of the roller drive motor 104. Rotation of the output shaft 104a of the roller drive motor 104 causes the belt wheel 108 to be likewise rotated thereby causing the belt 110 to be advanced. Advancement of the belt 110 causes the belt wheel 106 to be rotated, which in turn rotates the sealing roller 90 (see FIG. 13). Hence, when the processing unit 180 generates a first control signal on the control line 202, the sealing roller 90 may be advanced in the clockwise direction thereby causing the sealing ridge 140 of the sealing roller 90 to contact the leading edge portions 131 or the trailing edge portions 133 of the enclosure sheets ES positioned between the sealing roller 90 and the support roller 92. Alternatively, when the processing unit 180 generates a second control signal on the control line 202, the sealing roller 90 may be advanced in the counterclockwise direction thereby causing the sealing roller 90 to be rotated such that the front enclosure sheet $ES_{FRONT}$ and the back enclosure sheet $ES_{BACK}$ may be advanced through the advancement gap 141.

The processing unit 180 is electrically coupled to the roller drive motor 112 (see FIG. 13) via a control line 204. The processing unit 180 selectively generates a control signal on the control line 204 which causes rotation of the output shaft 112a of the roller drive motor 112. Rotation of the output shaft 112a of the roller drive motor 112 causes the belt wheel 130 to be likewise rotated thereby causing the belt 132 to be advanced. Advancement of the belt 132 causes the belt wheel 128 to be rotated which in turn rotates the support roller 92 and the lateral edge rollers 94, 96 (see FIG. 13). Hence, when the processing unit 180 generates a control signal on the control line 204, the support roller 92 and the lateral edge rollers 94, 96 are advanced thereby causing the enclosure sheets ES to be advanced through the nip of the nip roller assembly 134.

The processing unit 180 is electrically coupled to the print controller 182 via a bus 206. The print controller 182 includes the processing hardware needed to control the print engine 32. In particular, the print controller 182 includes a number of processors, such as a raster image processor (not shown), and memory devices (not shown) which are needed to enable the print engine 32 to print information on the enclosure sheets ES and the confidential sheets CS as they are advanced through the print engine 32. More specifically, the print controller 182 is provided to convert graphics and/or text data from the processing unit 180 into a raster or bit-mapped image for use by the print engine 32.

The print controller 182 is electrically coupled to the print engine 32 via a bus 208. The print controller 182 sends data indicative of the bit-mapped image to the print engine 32 via the bus 208 thereby causing the print engine 32 to print the image on one of the enclosure sheets ES or the confidential sheets CS being advanced through the print engine 32. Hence, the processing unit 180 sends data (i.e. graphics and/or text data) to the print controller 182 via the bus 206. Thereafter, the print controller 182 converts the data into a bit-mapped image which is transmitted for printing to the print engine 32 via the bus 208.

The processing unit 180 is electrically coupled to the communications interface 186 via a bus 211. In addition, the processing unit 180 and the communications interface 186 are electrically coupled to the memory device 184 via a pair of buses 210 and 212, respectively. Hence, the processing unit 180 may communicate with the communications interface 186 via the bus 211 so as to control the receipt and storage of data associated with a facsimile transmission into the memory device 184.

The communications interface 186 is also coupled to a data input line 214. The data input line 214 may be any signal line which is capable of transmitting digitized images for use by the communications interface 186. For example, the data input line 214 may be a standard telephone line.

The communications interface 186 includes the hardware needed to receive data associated with the various images included in a facsimile transmission, and thereafter convert such data into a format suitable for presentation to the processing unit 180. In particular, data associated with a facsimile transmission is received and converted by the communications interface 186, and thereafter stored in the memory device 184. The stored data may then be selectively retrieved from the memory device 184 by the processing unit 180 in order to be presented to the print controller 182 for subsequent printing onto one of the enclosure sheets ES or the confidential sheets CS by the print engine 32.

Figure 19:
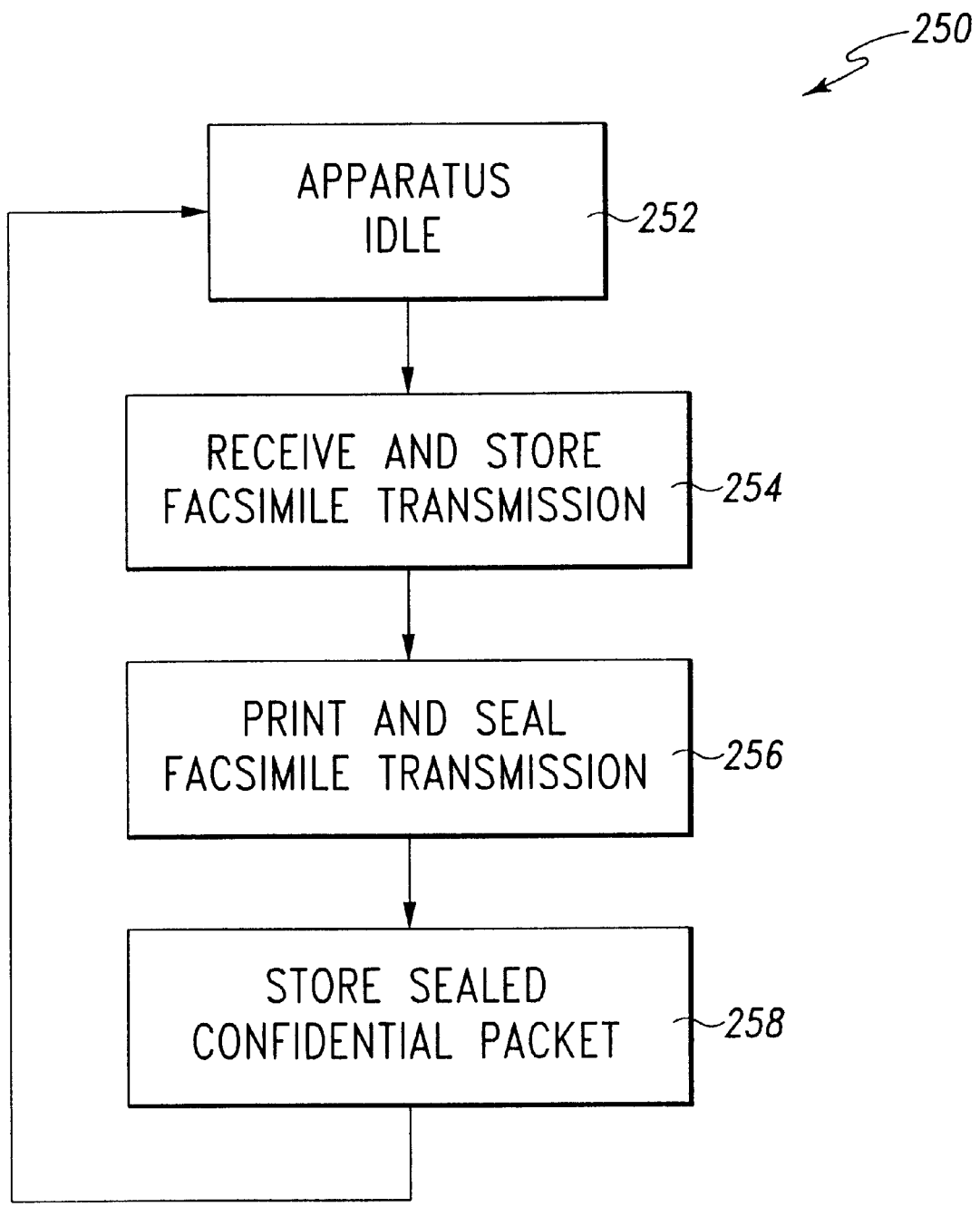
FIG. 19 is a flow chart setting forth a general procedure 250 for printing a confidential facsimile message with the document security apparatus of FIG. 1.

Referring now to FIG. 19, there is shown a flowchart which sets forth a general procedure 250 for printing and sealing a confidential facsimile transmission with the document security apparatus 10. Prior to when the confidential facsimile transmission is transmitted to the document security apparatus 10 via the data input line 214, the document security apparatus 10 is in an idle state (step 252). Once the confidential facsimile transmission begins to be transmitted to the document security apparatus 10, the routine 250 advances to step 254.

In step 254, the document security apparatus 10 communicates with a sending facsimile machine (not shown). In particular, the communications interface 186 of the document security apparatus 10 communicates with the sending facsimile machine in order to receive the confidential facsimile transmission. The communications interface 186 then converts the received facsimile transmission into a format suitable for presentation to the processing unit 180, and thereafter stores the facsimile transmission in the memory device 184.

At the completion of, or concurrently with the receive and store step 254, the routine 250 advances to step 256 in which the processing unit 180 retrieves the converted data associated with the confidential facsimile transmission from the memory device 184, prints the confidential facsimile transmission with the print engine 32, and seals the printed confidential facsimile transmission so as to create the sealed confidential packet CP (see FIG. 7D). At the completion of step 256, the routine 250 advances to step 258 in which the document security apparatus 10 advances the sealed confidential packet CP into the output tray 18 for subsequent storage thereof prior to retrieval of the sealed confidential packet CP by a user. At the completion of step 258, the routine 250 returns to step 252 in which the document security apparatus 10 remains in the idle state until a subsequent confidential facsimile transmission is transmitted thereto via the data input line 214.

Figure 20:
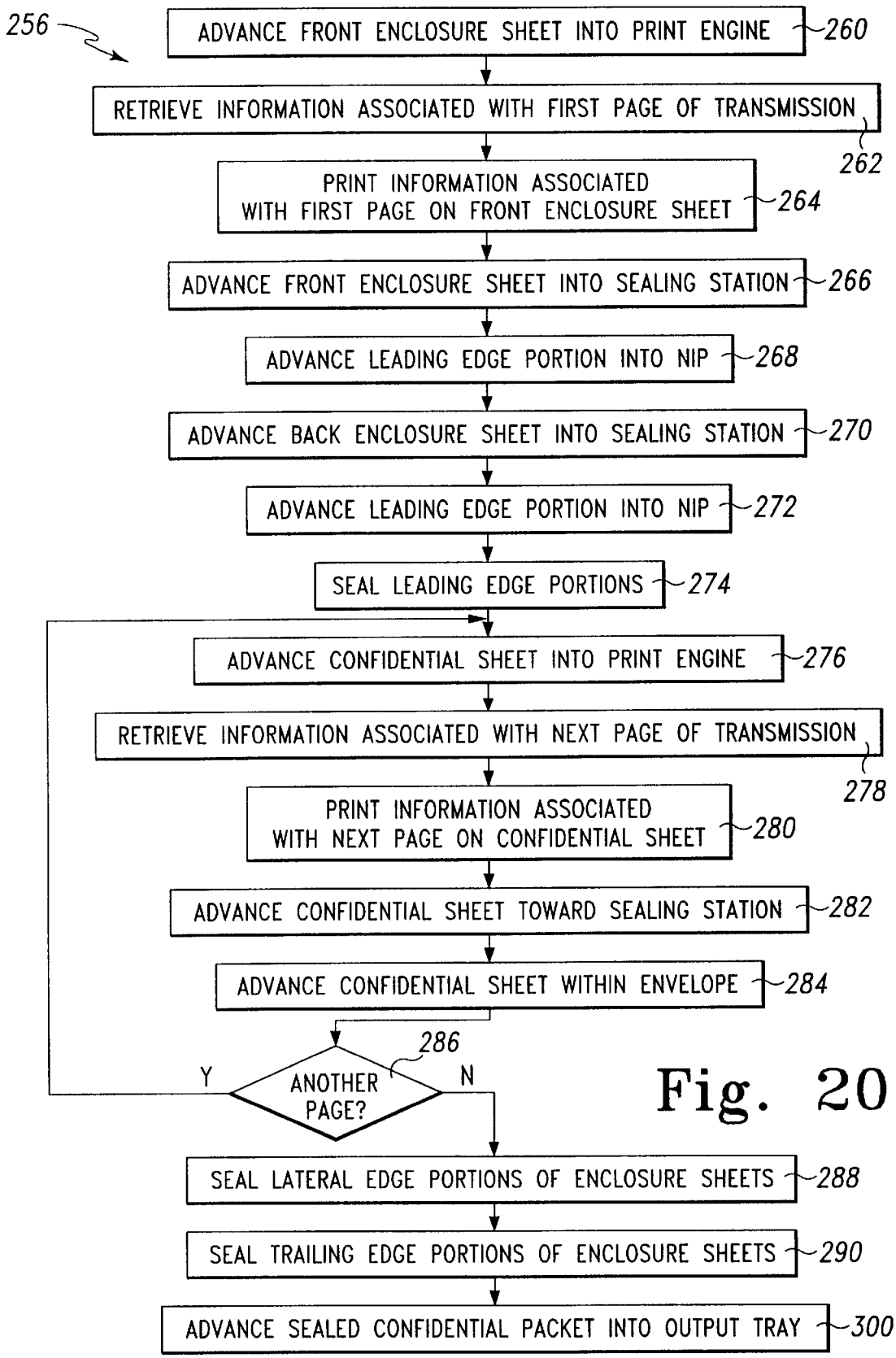
FIG. 20 is a flow chart setting forth the print and seal step 256 of the general procedure 250 of FIG. 19 in more detail.

Referring now to FIG. 20, there is shown a flowchart setting forth step 256 in greater detail. After completion of step 254 (see FIG. 19) is completed, the routine 256 advances to step 260. In step 260, the processing unit 180 causes one of the enclosure sheets ES to be advanced out of the lower input tray 16 and into the print engine 32. In particular, the processing unit generates a control signal on the control line 190 thereby actuating the roller drive motor 27 which in turn drives the feeding roller 24. As the feeding roller 24 is driven, the enclosure sheet ES is advanced into the print engine 32. The enclosure sheet ES advanced into the print engine 32 in step 260 is to become the front enclosure sheet $ES_{FRONT}$ (see FIG. 7C) of the sealed confidential packet CP (see FIG. 7D). The routine 256 then advances to step 262.

In step 262, the processing unit retrieves the data associated with a first page of the facsimile transmission which is stored in the memory device 184. In particular, the processing unit 180 generates a control signal on the bus 210 which instructs the memory device 184 to retrieve an electronic file associated with the image of the first page of the facsimile transmission. As shown in FIG. 7C, the first page of the facsimile transmission typically includes a banner 216. The banner 216 may include information such as the name of a recipient, the date, the recipient's company, the destination facsimile number, and a brief introductory message from the sender. The routine 256 then advances to step 264.

In step 264, the first page of the facsimile transmission, including the banner 216, is printed on the front side 127 of the front enclosure sheet $ES_{FRONT}$ (see FIG. 7C). In particular, the processing unit 180 sends the data associated with the first page of the facsimile transmission to the print controller 182 via the bus 206. Thereafter, the print controller 182 communicates with the print engine 32 thereby causing the first page of the facsimile transmission to be printed on the front side 127 of the front enclosure sheet $ES_{FRONT}$ in the manner previously described. It should be appreciated that the front side 127 of the front enclosure sheet $ES_{FRONT}$ on which the first page of the facsimile transmission is printed is to become an exterior surface of the envelope 91 (see FIG. 31), whereas the unprinted back side 129 of the front enclosure sheet $ES_{FRONT}$ is to become an interior surface of the envelope 91. The routine 256 then advances to step 266.

In step 266, the processing unit 180 causes the front enclosure sheet $ES_{FRONT}$ to be advanced along a front enclosure sheet paper path (see FIG. 4). In particular, the processing unit 180 generates a control signal on the control line 192 thereby actuating the roller drive motor 42 which in turn drives the advancing roller 34. As the advancing roller 34 is driven, the front enclosure sheet $ES_{FRONT}$ is advanced out of the print engine 32. The processing unit 180 then generates a control signal on the control line 194 thereby causing the diverter solenoid 46 to be actuated such that the diverter 36 is positioned in the first diverter position, as shown in FIG. 4. When the diverter 36 is positioned in the first diverter position, the front enclosure sheet $ES_{FRONT}$ is advanced along the lower plate 40 such that the front side 127 thereof is facing downwardly and in contact with the lower plate 40.

The processing unit 180 also generates control signals on the control line 198 thereby causing the scuffer drive motor 66 to be actuated. As described above, actuation of the scuffer drive motor 66 causes the front enclosure sheet $ES_{FRONT}$ to be nudged along the lower plate 40. Moreover, the processing unit 180 generates a control signal on the control line 200 thereby actuating the deflector solenoid 86 such that the deflector arms 76, 78 are positioned in the raised deflector position (see FIG. 11) so that the front enclosure sheet $ES_{FRONT}$ may be advanced thereunder. The routine 256 then advances to step 268.

In step 268, the leading edge portion 131 of the front enclosure sheet $ES_{FRONT}$ is advanced into the nip of the nip roller assembly 134 (see FIG. 8). In particular, the processing unit 180 generates a control signal on the control line 204 which actuates the roller motor 112 (see FIG. 13). Actuation of the roller motor 112 causes the support roller 92 and hence the lateral edge rollers 94, 96 to be rotated thereby causing the leading edge portion 131 of the front enclosure sheet $ES_{FRONT}$ to be advanced into the nip of the nip roller assembly 134. As shown in FIG. 27, the front enclosure sheet $ES_{FRONT}$ is advanced a predetermined distance into the nip. Such advancement is performed so that the adhesive sections 138 on the back side 129 of the front enclosure sheet $ES_{FRONT}$ may be aligned with the adhesive sections 136 on the front side 127 of the back enclosure sheet $ES_{BACK}$ when the back enclosure sheet $ES_{BACK}$ is advanced into the nip (see FIG. 21), as described in more detail below. The routine 256 then advances to step 270.

In step 270, a second enclosure sheet ES is advanced out of the lower input tray 16 and along a back enclosure sheet paper path, as shown in FIG. 5. In particular, the processing unit generates a control signal on the control line 190 thereby actuating the roller drive motor 27 which in turn drives the feeding roller 24. As the feeding roller 24 is driven, the second enclosure sheet ES is advanced out of the lower input tray 16 and into the print engine 32. The enclosure sheet ES advanced into the print engine 32 in step 270 is to become the back enclosure sheet $ES_{BACK}$ of the sealed confidential packet CP (see FIG. 7D).

Information associated with a page of the facsimile transmission is not printed on the back enclosure sheet $ES_{BACK}$ as it is advanced through the print engine 32. In particular, the processing unit 180 does not send data associated with the second page of the facsimile transmission to the print controller 182 for subsequent printing onto the back enclosure sheet $ES_{BACK}$, but rather the data associated with the second page of the facsimile transmission is maintained in the memory device 184 in order to be printed in step 280 below.

Hence, in step 270 the back enclosure sheet $ES_{BACK}$ is advanced through the print engine 32 by the advancing rollers (not shown) associated with the print engine 32, and thereafter the processing unit 180 generates a control signal on the control line 192 thereby actuating the roller drive motor 42 which in turn drives the advancing roller 34. As the advancing roller 34 is driven, the back enclosure sheet $ES_{BACK}$ is advanced out of the print engine 32. The processing unit 180 then generates a control signal on the control line 194 thereby causing the diverter solenoid 46 to be actuated such that the diverter 36 is positioned in the second diverter position as shown in FIG. 5. When the diverter 36 is positioned in the second diverter position, the back enclosure sheet $ES_{BACK}$ is advanced along the upper plate 38 such that the front side 127 thereof is facing downwardly and in contact with the upper plate 38.

The processing unit 180 also generates control signals on the control line 196 thereby causing the scuffer drive motor 54 to be actuated. As described above, actuation of the scuffer drive motor 54 causes the back enclosure sheet $ES_{BACK}$ to be nudged along the upper plate 38 and into the sealing station 20. The routine 256 then advances to step 272.

In step 272, the leading edge portion 131 of the back enclosure sheet $ES_{BACK}$ is advanced into the nip of the nip roller assembly 134. In particular, the processing unit 180 generates a control signal on the control line 204 which actuates the roller motor 112 (see FIG. 13). Actuation of the roller motor 112 causes the support roller 92 and hence the lateral edge rollers 94, 96 to be rotated thereby causing the leading edge portion 131 of the back enclosure sheet $ES_{BACK}$, along with the leading edge 131 portion of the front enclosure sheet $ES_{FRONT}$, to be advanced in concert into the nip. As shown in FIGS. 28 and 31, when the back enclosure sheet $ES_{BACK}$ is advanced toward the nip of the nip roller assembly 134, the pocket 43 is created into which a number of confidential sheets CS may later be advanced. The back enclosure sheet $ES_{BACK}$ is then advanced further into the nip so that the adhesive sections 136 disposed on the leading edge portion 131 thereof align with the adhesive sections 138 disposed on the leading edge portion 131 of the front enclosure sheet $ES_{FRONT}$ which is already positioned in the nip (see FIG. 21). The routine 256 then advances to step 274.

In step 274, the leading edge portion 131 of the front enclosure sheet $ES_{FRONT}$ is sealed to the leading edge portion 131 of the back enclosure sheet $ES_{BACK}$. In particular, the processing unit 180 generates a control signal on the control line 202 which actuates the roller motor 104 (see FIG. 13). As shown in FIGS. 22 and 29, actuation of the roller motor 104 causes the sealing roller 90 to be rotated thereby causing the sealing ridge 140 of the sealing roller 90 to be rotated into contact with the leading edge portions 131 of the front enclosure sheet $ES_{FRONT}$ and the back enclosure sheet $ES_{BACK}$. In particular, as the sealing ridge 140 of the sealing roller 90 is rotated, the adhesive sections 136 on the front side 127 of the back enclosure sheet $ES_{BACK}$ are urged into contact with the adhesive sections 138 on the back side 129 of the front enclosure sheet $ES_{FRONT}$ thereby sealing the leading edge portions 131 of the front enclosure sheet $ES_{FRONT}$ and the back enclosure sheet $ES_{BACK}$ to one another. As shown in FIG. 29, when the leading edge portions 131 of the front enclosure sheet $ES_{FRONT}$ and the back enclosure sheet $ES_{BACK}$ are sealed to one another, the envelope 91 is formed. The sealing roller 90 is then maintained in a position such that the sealing ridge 140 contacts the back enclosure sheet $ES_{BACK}$ and the front enclosure sheet $ES_{FRONT}$, as shown in FIG. 29, during the subsequent advancement of the confidential sheets CS into the envelope 91 as described below. The routine 256 then advances to step 276.

In step 276, one of the plain-paper, unprinted confidential sheets CS is advanced out of the upper input tray 14 and into the print engine 32. In particular, the processing unit 180 generates a control signal on the control line 188 thereby actuating the roller drive motor 26 which in turn drives the feeding roller 22. As the feeding roller 22 is driven, the confidential sheet CS is advanced out of the upper input tray 14 and into the print engine 32. The routine 256 then advances to step 278.

In step 278, the processing unit 180 retrieves data associated with a next page of the facsimile transmission which is stored in the memory device 184. In particular, the processing unit 180 generates a control signal on the bus 210 which instructs the memory device 184 to retrieve an electronic file associated with the image of the next page of the facsimile transmission. For example, the processing unit 180 retrieves the electronic file associated with the second page of the facsimile transmission when the first confidential sheet CS is positioned in the print engine 32, the third page of the facsimile transmission when the second confidential sheet CS is positioned in the print engine 32, and so on. The routine 256 then advances to step 280.

In step 280, the next page of the facsimile transmission is printed on the confidential sheet CS. In particular, the processing unit 180 sends the data associated with the next page of the facsimile transmission to the print controller 182 via the bus 206. Thereafter, the print controller 182 communicates with the print engine 32 thereby causing the information associated with the next page of the facsimile transmission to be printed on the confidential sheet CS. For example, the first confidential sheet CS is advanced into the print engine 32 has the second page of the facsimile transmission printed thereon (with the first page of the facsimile transmission having been printed on the front enclosure sheet $ES_{FRONT}$), the second confidential sheet CS advanced into the print engine 32 has the third page of the facsimile transmission printed thereon, and so on. The routine 256 then advances to step 282.

In step 282, the confidential sheet CS is advanced along a confidential sheet paper path (see FIG. 6). In particular, the processing unit 180 generates a control signal on the control line 192 thereby actuating the roller drive motor 42 which in turn drives the advancing roller 34. As the advancing roller 34 is driven, the confidential sheet CS is advanced out of the print engine 32 in the direction of the arrows shown in FIG. 6. The processing unit 180 then generates a control signal on the control line 194 thereby causing the diverter solenoid 46 to be actuated such that the diverter 36 is positioned in the first diverter position as shown in FIG. 6. When the diverter 36 is positioned in the first diverter position, the confidential sheet CS is advanced along the lower plate 40 such that a front side thereof (i.e. the side that was printed on in step 280) is facing downwardly and in contact with the back side 129 of the front enclosure sheet $ES_{FRONT}$ which is positioned on the bottom plate 40.

The processing unit 180 also generates control signals on the control line 198 thereby causing the scuffer drive motor 66 to be actuated. As described above, actuation of the scuffer drive motor 66 causes the confidential sheets CS to be nudged along the front enclosure sheet $ES_{FRONT}$ positioned on the lower plate 40. Moreover, the processing unit 180 generates a control signal on the control line 200 thereby actuating the deflector solenoid 86 such that the deflector arms 76, 78 are positioned in the lowered deflector position (see FIG. 12) such that the confidential sheet CS may be advanced between the upper guide members 85 and the lower guide members 82. The routine 256 then advances to step 284.

In step 284, the confidential sheet CS is advanced within the envelope 91. In particular, the processing unit continues to generate control signals on the control line 198 such that the stepper or scuffer drive motor 66 nudges the confidential sheet CS within the envelope 91 defined by the front enclosure sheet $ES_{FRONT}$ and the back enclosure sheet $ES_{BACK}$. Thereafter, the routine 256 advances to step 286.

In step 286, the processing unit 180 determines if there is another page associated with the facsimile transmission. In particular, the processing unit 180 generates a signal on the bus 210 which is sent to the memory device 184 in order to query the memory device 184 as to if data associated with another page of the facsimile device is stored therein. If there is another page associated with the facsimile transmission, the routine 256 advances to step 276 in order to advance another one of the confidential sheets CS into the print engine 32 for printing. If there is not another page associated with the facsimile transmission, the routine 256 advances to step 288.

In step 288, the lateral edge portions 135, 137 of the front enclosure sheet $ES_{FRONT}$ and the back enclosure sheet $ES_{BACK}$ are sealed to one another. In particular, the processing unit 180 generates a control signal on the control line 204 thereby causing actuation of the roller motor 112. Actuation of the roller motor 112 causes rotation of the support roller 92 and the lateral edge rollers 94, 96 thereby causing the front enclosure sheet $ES_{FRONT}$, the back enclosure sheet $ES_{BACK}$, and the confidential sheets CS therebetween to be advanced through the nip of the nip roller assembly 134. As described above, the lateral edge portions 135, 137 are advanced between the lateral edge rollers 94, 96 and the support roller 92, respectively. As a result, the adhesive sections 136, 138 along the lateral edge portions 135, 137 are urged into contact with one another thereby sealing the lateral edge portions 135, 137. Once the lateral edge portions 135, 137 have been sealed, the routine 256 advances to step 290.

In step 290, the trailing edge portions 133 of the front enclosure sheet $ES_{FRONT}$ and the back enclosure sheet $ES_{BACK}$ are sealed to one another. In particular, when the trailing edge portions 133 of the front enclosure sheet $ES_{FRONT}$ and the back enclosure sheet $ES_{BACK}$ are positioned between the sealing roller 90 and the support roller 92, the processing unit 180 ceases to generate a control signal on the control line 204 thereby ceasing advancement of the front enclosure sheet $ES_{FRONT}$ and the back enclosure sheet $ES_{BACK}$. Thereafter, the processing unit 180 generates a control signal on the control line 202 which actuates the roller motor 104 (see FIG. 13). As shown in FIGS. 25 and 26, actuation of the roller motor 104 causes the sealing roller 90 to be rotated thereby causing the sealing ridge 140 of the sealing roller 90 to be rotated into contact with the trailing edge portions 133 of the front enclosure sheet $ES_{FRONT}$ and the back enclosure sheet $ES_{BACK}$. In particular, as the sealing ridge 140 of the sealing roller 90 is rotated, the adhesive sections 136 on the front side 127 of the back enclosure sheet $ES_{BACK}$ are urged into contact with the adhesive sections 138 on the back side 129 of the front enclosure sheet $ES_{FRONT}$ thereby sealing the trailing edge portions 133 of the front enclosure sheet $ES_{FRONT}$ and the back enclosure sheet $ES_{BACK}$ to one another thereby creating the sealed confidential packet CP (see FIG. 7D). Once the trailing edge portions 133 of the front enclosure sheet $ES_{FRONT}$ and the back enclosure sheet $ES_{BACK}$ are sealed to one another, the routine 256 advances to step 300.

In step 300, the sealed confidential packet CP is advanced out of the sealing station 20 and into the output tray 18. In particular, the processing unit 180 generates a control signal on the control line 204 thereby causing actuation of the roller motor 112. Actuation of the roller motor 112 causes rotation of the support roller 92 and the lateral edge rollers 94, 96 thereby causing the sealed confidential packet CP to be advanced through the nip of the nip roller assembly 134 and into the output tray 18.

Referring now to FIGS. 32–35, there is shown a document security apparatus 310 which is a second embodiment of the present invention. The document security apparatus 310 is somewhat similar to the document security apparatus 10. Thus, the same reference numerals are used in FIGS. 32–35 to designate common components which were previously discussed in regard to FIGS. 1–31.

The document security apparatus 310 is configured in order to be coupled to a separate document reproduction machine 312, such as a laser printer. In particular, the document security apparatus 310 does not include an internal print engine (such as the print engine 32 of the document security apparatus 10), but rather works in conjunction with a print engine 314 included in the laser printer 312. Although the document reproduction machine 312 is described as a laser printer, it should be appreciated that document security apparatus 10 may be coupled to other types of document reproduction machines such as a photocopy machine or a facsimile machine.

A number of the components embodied within document security apparatus 10 are included in the laser printer 312 shown in FIGS. 32–35. In particular, the upper input tray 14, the lower input tray 16, the feeding rollers 22, and the feeding rollers 24 are included in the laser printer 12. Also, the document security apparatus 310 may be embodied with a number of additional components as compared to the document security apparatus 10. In particular, a component interface 386 may be provided to permit the processing unit 180 of the document security apparatus 310 to communicate with a print controller 382 of the laser printer 312. Additionally, it should be appreciated that the component interface 386 is electrically coupled to both the processing unit 180 and the print controller 382 in a known manner.

Operation of the document security apparatus 310 shall now be discussed in detail. In order to provide confidentiality to a printing operation being performed by the laser printer 312, an enclosure sheet ES is first advanced out of the lower input tray 16 and into the print engine 314. In particular, the processing unit 180 generates a control signal which causes the feeding roller 24 of the laser printer 312 to be driven. As the feeding roller 24 is driven, the enclosure sheet ES is advanced into the print engine 314. The enclosure sheet ES first advanced into the print engine 314 is to become the front enclosure sheet $ES_{FRONT}$ (see FIG. 7C) of the sealed confidential packet CP (see FIG. 7D) which includes information associated with the printing operation being performed by the laser printer 312. Once advanced into the print engine 314, information associated with a first page of the printing operation is then printed on the front side 127 of the front enclosure sheet $ES_{FRONT}$ (see FIG. 7C) It should be appreciated that the front side 127 of the front enclosure sheet $ES_{FRONT}$, on which the first page of the printing operation is printed, is to become the exterior surface of the envelope 91, whereas the unprinted back side 129 of the front enclosure sheet $ES_{FRONT}$ is to become the interior surface of the envelope 91.

Figure 32:
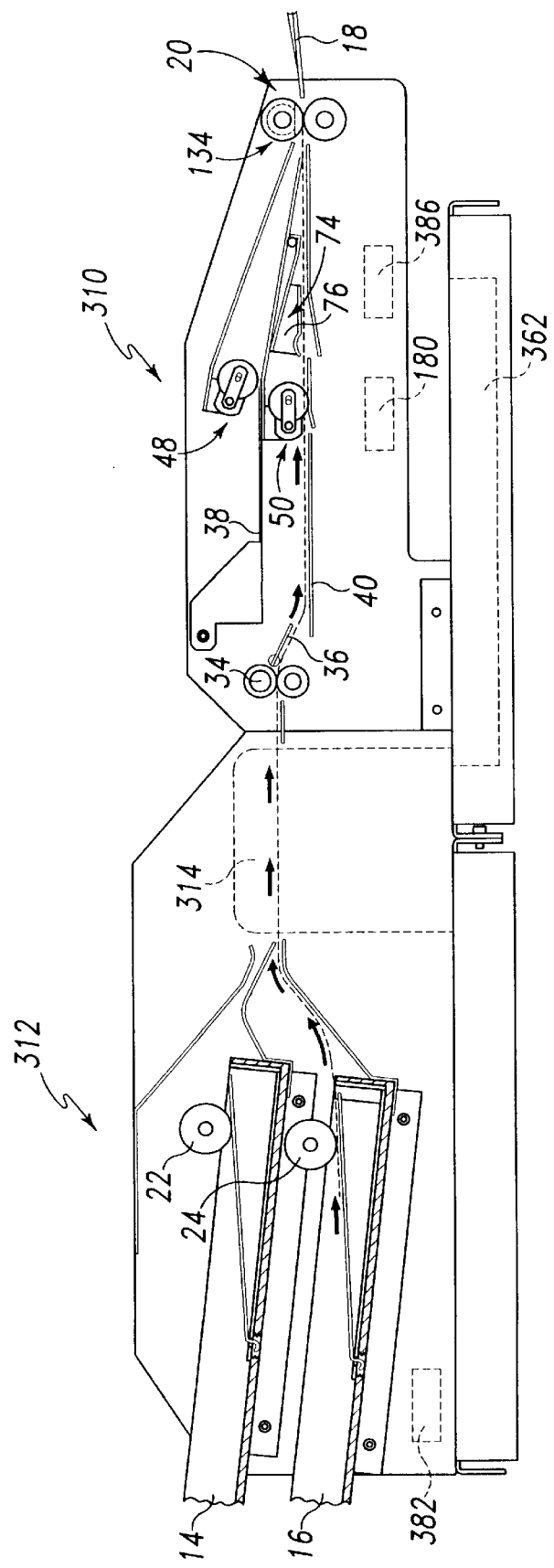
FIG. 32 is a schematic view showing a first paper path of travel of a second embodiment of a document security apparatus which incorporates the features of the present invention therein.

The front enclosure sheet $ES_{FRONT}$ is then advanced along a front enclosure sheet paper path (see FIG. 32). In particular, the processing unit 180 generates a control signal which causes the advancing roller 34 to be driven. As the advancing roller 34 is driven, the front enclosure sheet $ES_{FRONT}$ is advanced out of the print engine 314, and out of the laser printer 312. The processing unit 180 then generates a control signal which causes the diverter 36 to be positioned in the first diverter position, as shown in FIG. 32. When the diverter 36 is positioned in the first diverter position, the front enclosure sheet $ES_{FRONT}$ is advanced along the lower plate 40 such that the front side 127 thereof is facing downwardly and in contact with the lower plate 40.

The processing unit 180 then generates control signals which cause the scuffer drive motor 66 to be actuated. As described above, actuation of the scuffer drive motor 66 causes the front enclosure sheet $ES_{FRONT}$ to be nudged along the lower plate 40. The processing unit 180 then generates a control signal such that the sheet guiding assembly 74 (i.e. the deflector arms 76, 78) is positioned in the raised deflector position (see FIG. 11) so that the front enclosure sheet $ES_{FRONT}$ may be advanced thereunder.

The leading edge portion 131 of the front enclosure sheet $ES_{FRONT}$ is then advanced into the nip of the nip roller assembly 134 of the sealing station 20.

As described above, the front enclosure sheet $ES_{FRONT}$ is advanced a predetermined distance into the nip so that the adhesive sections 138 on the back side 129 thereof may be aligned with the adhesive sections 136 on the front side 127 of the back enclosure sheet $ES_{BACK}$ when the back enclosure sheet $ES_{BACK}$ is advanced into the nip (see FIG. 21), as described in more detail below.

Figure 33:
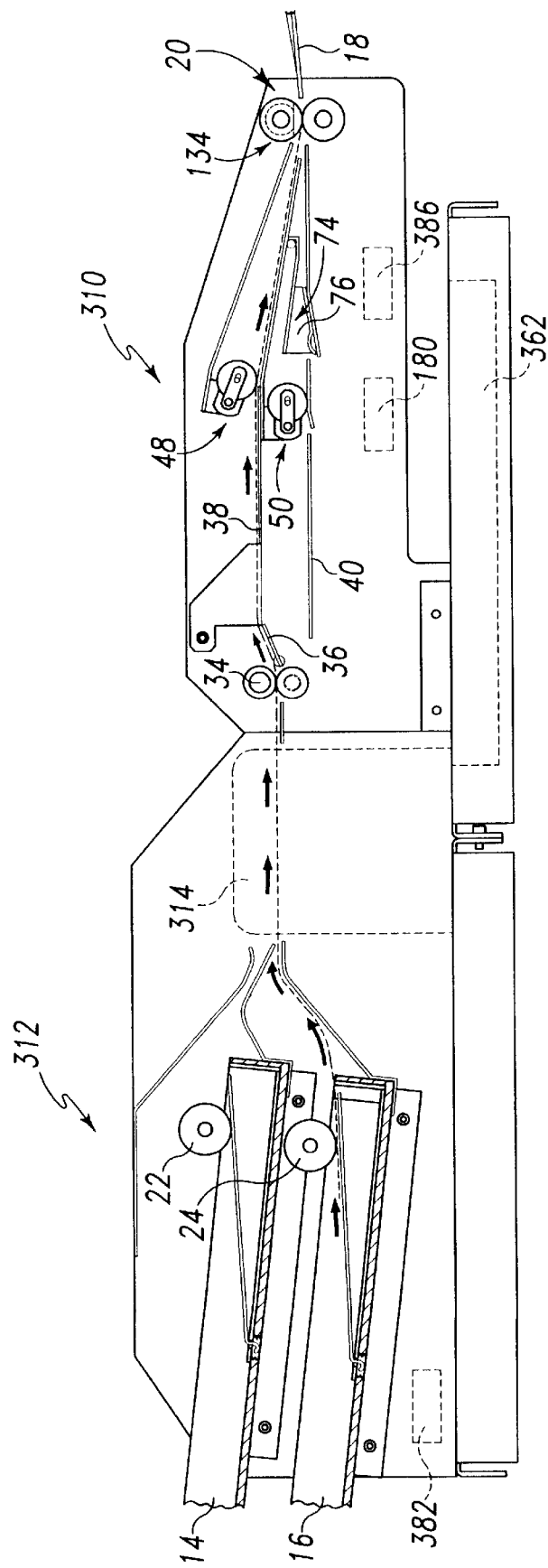
FIG. 33 is a view similar to FIG. 32, but showing a second paper path of travel.

A second enclosure sheet ES is then advanced out of the lower input tray 16 and along a back enclosure sheet paper path, as shown in FIG. 33. In particular, the processing unit 180 generates a control signal which causes the feeding roller 24 of the laser printer 312 to be driven. As the feeding roller 24 is driven, the second enclosure sheet ES is advanced out of the lower input tray 16 and into the print engine 314. The second enclosure sheet ES advanced into the print engine 314 is to become the back enclosure sheet $ES_{BACK}$ of the sealed confidential packet CP (see FIG. 7D). As discussed above in regard to the document security apparatus 10, information associated with a page of the printing operation is not printed on the back enclosure sheet $ES_{BACK}$ as it is advanced through the print engine 314.

The processing unit 180 then generates a control signal which causes the advancing roller 34 to be driven. As the advancing roller 34 is driven, the back enclosure sheet $ES_{BACK}$ is advanced out of the print engine 314, and out of the laser printer 312. The processing unit 180 then generates a control signal which causes the diverter 36 to be positioned in the second diverter position, as shown in FIG. 33. When the diverter 36 is positioned in the second diverter position, the back enclosure sheet $ES_{BACK}$ is advanced along the upper plate 38 such that the front side 127 thereof is facing downwardly and in contact with the upper plate 38.

The processing unit 180 then generates control signals which cause the scuffer drive motor 54 to be actuated. As described above, actuation of the scuffer drive motor 54 causes the back enclosure sheet $ES_{BACK}$ to be nudged along the upper plate 38 and into the sealing station 20. As shown in FIGS. 28 and 31, when the back enclosure sheet $ES_{BACK}$ is positioned on the upper plate 38 and the front enclosure sheet $ES_{FRONT}$ is positioned on the lower plate 40, the pocket 43 is created into which a number of confidential sheets CS may later be advanced.

The leading edge portion 131 of the back enclosure sheet $ES_{BACK}$ is then advanced into the nip of the nip roller assembly 134 thereby causing the leading edge portion 131 of the back enclosure sheet $ES_{BACK}$, along with the leading edge 131 portion of the front enclosure sheet $ES_{FRONT}$, to be advanced in concert into the nip. The back enclosure sheet $ES_{BACK}$ is then advanced further into the nip so that the adhesive sections 136 disposed on the leading edge portion 131 thereof align with the adhesive sections 138 disposed on the leading edge portion 131 of the front enclosure sheet $ES_{FRONT}$ which is already positioned in the nip (see FIG. 21).

The leading edge portion 131 of the front enclosure sheet $ES_{FRONT}$ is then sealed to the leading edge portion 131 of the back enclosure sheet $ES_{BACK}$. In particular, the processing unit 180 generates a control signal which causes the sealing roller 90 to be rotated thereby causing the sealing ridge 140 of the sealing roller 90 to be rotated into contact with the leading edge portions 131 of the front enclosure sheet $ES_{FRONT}$ and the back enclosure sheet $ES_{BACK}$. In particular, as the sealing ridge 140 of the sealing roller 90 is rotated, the adhesive sections 136 on the front side 127 of the back enclosure sheet $ES_{BACK}$ are urged into contact with the adhesive sections 138 on the back side 129 of the front enclosure sheet $ES_{FRONT}$ thereby sealing the leading edge portions 131 of the front enclosure sheet $ES_{FRONT}$ and the back enclosure sheet $ES_{BACK}$ to one another. As shown in FIG. 29, when the leading edge portions 131 of the front enclosure sheet $ES_{FRONT}$ and the back enclosure sheet $ES_{BACK}$ are sealed to one another, the envelope 91 is formed. The sealing roller 90 is then maintained in a position such that the sealing ridge 140 contacts the back enclosure sheet $ES_{BACK}$ and the front enclosure sheet $ES_{FRONT}$, as shown in FIG. 29, during the subsequent advancement of the confidential sheets CS into the envelope 91 as described below.

One of the plain-paper, unprinted confidential sheets CS is then advanced out of the upper input tray 14 and into the print engine 314. In particular, the processing unit 180 generates a control signal which causes the feeding roller 22 of the laser printer 312 to be driven. As the feeding roller 22 is driven, the confidential sheet CS is advanced out of the upper input tray 14 and into the print engine 314.

Once positioned in the print engine 314, information associated with the next page of the printing operation is printed on the confidential sheet CS. For example, the first confidential sheet CS advanced into the print engine 314 has the second page of the printing operation printed thereon (with the first page of the printing operation having been printed on the front enclosure sheet $ES_{FRONT}$), the second confidential sheet CS advanced into the print engine 314 has the third page of the printing operation printed thereon, and so on.

Figure 34:
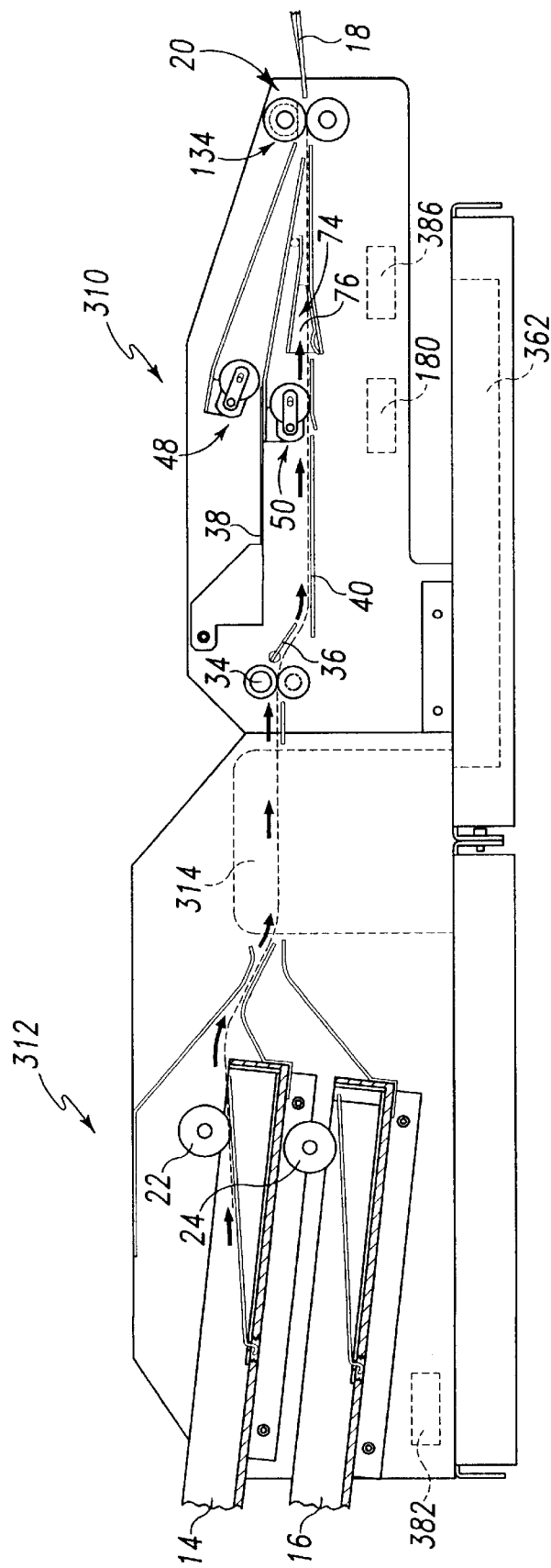
FIG. 34 is a view similar to FIG. 32, but showing a third paper path of travel.

The confidential sheet CS is then advanced along a confidential sheet paper path (see FIG. 34). In particular, the processing unit 180 generates a control signal which causes the advancing roller 34 to be driven. As the advancing roller 34 is driven, the confidential sheet CS is advanced out of the print engine 314, and out of the laser printer 312. The processing unit 180 then generates a control signal which causes the diverter 36 to be positioned in the first diverter position as shown in FIG. 34. When the diverter 36 is positioned in the first diverter position, the confidential sheet CS is advanced along the lower plate 40 such that a front side thereof (i.e. the side that was printed on) is facing downwardly and in contact with the back side 129 of the front enclosure sheet $ES_{FRONT}$ which is positioned on the bottom plate 40.

The processing unit 180 then generates control signals which cause the scuffer drive motor 66 to be actuated. As described above, actuation of the scuffer drive motor 66 causes the confidential sheets CS to be nudged along the front enclosure sheet $ES_{FRONT}$ positioned on the lower plate 40. Moreover, the processing unit 180 generates a control signal which cause the sheet guiding assembly 74 (i.e. the deflector arms 76, 78) to be positioned in the lowered deflector position (see FIG. 12) such that the confidential sheet CS may be advanced between the upper guide members 85 and the lower guide members 82.

The confidential sheet CS is then advanced within the envelope 91. In particular, the processing unit continues to generate control signals such that the stepper or scuffer drive motor 66 nudges the confidential sheet CS within the envelope 91 defined by the front enclosure sheet $ES_{FRONT}$ and the back enclosure sheet $ES_{BACK}$.

If there is no further pages associated with the printing operation, the lateral edge portions 135, 137 of the front enclosure sheet $ES_{FRONT}$ and the back enclosure sheet $ES_{BACK}$ are sealed to one another. In particular, the processing unit 180 generates a control signal which causes rotation of the support roller 92 and the lateral edge rollers 94, 96 thereby causing the front enclosure sheet $ES_{FRONT}$, the back enclosure sheet $ES_{BACK}$, and the confidential sheets CS therebetween to be advanced through the nip of the nip roller assembly 134. As described above, the lateral edge portions 135, 137 are advanced between the lateral edge rollers 94, 96, and support roller 92, respectively. As a result, the adhesive sections 136, 138 along the lateral edge portions 135, 137 are urged into contact with one another thereby sealing the lateral edge portions 135, 137 together.

The trailing edge portions 133 of the front enclosure sheet $ES_{FRONT}$ and the back enclosure sheet $ES_{BACK}$ are then sealed to one another. In particular, when the trailing edge portions 133 of the front enclosure sheet $ES_{FRONT}$ and the back enclosure sheet $ES_{BACK}$ are positioned between the sealing roller 90 and the support roller 92, the processing unit 180 ceases advancement of the front enclosure sheet $ES_{FRONT}$ and the back enclosure sheet $ES_{BACK}$. Thereafter, the processing unit 180 generates a control signal which causes the sealing roller 90 to be rotated thereby causing the sealing ridge 140 of the sealing roller 90 to be rotated into contact with the trailing edge portions 133 of the front enclosure sheet $ES_{FRONT}$ and the back enclosure sheet $ES_{BACK}$. In particular, as the sealing ridge 140 of the sealing roller 90 is rotated, the adhesive sections 136 on the of the back enclosure sheet ES$_{BACK}$ are urged into contact with the adhesive sections 138 on the back side 129 of the front enclosure sheet ES$_{FRONT}$ thereby sealing the trailing edge portions 133 of the front enclosure sheet ES$_{FRONT}$ and the back enclosure sheet ES$_{BACK}$ to one another thereby creating the sealed confidential packet CP (see FIG. 7D).

Once the trailing edge portions 133 of the front enclosure sheet ES$_{FRONT}$ and the back enclosure sheet ES$_{BACK}$ are sealed to one another, the sealed confidential packet CP is advanced out of the sealing station 20 and into the output tray 18. In particular, the processing unit 180 generates and control signal which causes rotation of the support roller 92 and the lateral edge rollers 94, 96 thereby causing the sealed confidential packet CP to be advanced through the nip of the nip roller assembly 134 and into the output tray 18.

The document security apparatus 310 may be configured to allow messages of a non-confidential nature to be printed without being sealed within a sealed confidential packet CP. For example, as shown in FIG. 35, the document security apparatus 310 may include a non-confidential output tray 362. In addition to the first diverter position (see FIGS. 32 and 34), and the second diverter position (see FIG. 33), the diverter 36 may be positioned in a third diverter position. When positioned in the third diverter position, printed confidential sheets CS may be advanced from the laser printer 312 and into the non-confidential output tray 362 without being advanced into the sealing station 20. Such advancement of the confidential sheets CS may be desirable when the information associated with the printing operation is non-confidential in nature.

It should be appreciated that the document security apparatus 10 of FIGS. 1–31 may likewise be configured with a non-confidential output tray similar to the non-confidential output tray 362 of the document security apparatus 310 so as to allow printing and storage of printed sheets associated with a non-confidential facsimile transmission.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

It should be appreciated that the document security apparatus 10, 310 may accommodate output of the enclosure sheets ES and the confidential sheets CS from the print engine 32 and the laser printer 312, respectively, in one of a number of different orientations. In particular, with minor modification, the document security apparatus 10, 310, may accommodate 10 either "face up" or "face down" output of the enclosure sheets ES and confidential sheets CS from the print engine 32 and the laser printer 312, respectively. Such modification may be necessary in order to allow the document security apparatus 10, 310 to be used in conjunction with a broad range of commercially available print engines, laser printers, facsimile machines, photocopiers, etc.

What is claimed is:

1. A sealing assembly, comprising:
a support roller;
a center roller having a sealing ridge attached thereto which operatively contacts said support roller so as to urge a first enclosure sheet into contact with a second enclosure sheet;
a first edge roller which operatively contacts said support roller so as to urge said first enclosure sheet into contact with said second enclosure sheet, wherein (1) said center roller and said first edge roller are rotatably supported on a common axis, and (2) said center roller rotates independently of said first edge roller; and
a second edge roller which operatively contacts said support roller so as to urge said first enclosure sheet into contact with said second enclosure sheet,
wherein said center roller, said first edge roller, and said second edge roller are rotatably supported on said common axis,
wherein said first edge roller rotates dependently of said second edge roller, and
wherein said first edge roller and second edge roller are each held stationary during rotation of said center roller.

2. The assembly of claim 1, further comprising:
a first drive motor having a first output shaft which is mechanically coupled to said first edge roller and said second edge roller.

3. The assembly of claim 2, wherein said first output shaft of said first drive motor is further mechanically coupled to said support roller, further comprising:
a first support roller gear which is non-rotatably secured to said support roller;
a second support roller gear which is non-rotatably secured to said support roller;
a first edge roller gear which is non-rotatably secured to said first edge roller, said first edge roller gear meshingly engages said first support roller gear; and
a second edge roller gear which is non-rotatably secured to said second edge roller, said second edge roller gear meshingly engages said second support roller gear.

4. The assembly of claim 3, further comprising a second drive motor having a second output shaft which is mechanically coupled to said center roller.

5. The assembly of claim 4, wherein said center roller further rotates independently of said second edge roller and said support roller.

6. The assembly of claim 1, wherein:
said first enclosure sheet includes a first pressure sensitive adhesive thereon,
said second enclosure sheet includes a second pressure sensitive adhesive thereon,
said center roller urges said first pressure sensitive adhesive toward said second pressure sensitive adhesive so as to form a first seal portion which extends in a first direction which is perpendicular to a path of movement of said first and second enclosure sheets, and
said first edge roller urges said first pressure sensitive adhesive toward said second pressure sensitive adhesive so as to form a second seal portion which extends in a second direction which is parallel to said path of movement of said first and second enclosure sheets.

7. A method of sealing an envelope in a document security apparatus, comprising the steps of:
advancing a first enclosure sheet and a second enclosure sheet in a path of movement so that the first enclosure sheet is positioned between (1) a center roller and a support roller, and (2) a first edge roller and the support roller, wherein (i) the first enclosure sheet includes a first pressure sensitive adhesive thereon, (ii) the second enclosure sheet includes a second pressure sensitive adhesive thereon;
urging the first pressure sensitive adhesive toward the second pressure sensitive adhesive with the center roller so as to form a first seal portion which extends in a first direction which is perpendicular to the path of movement of the first and second enclosure sheets during a first period of time; and urging the first pressure sensitive adhesive toward the second pressure sensitive adhesive with the first edge roller so as to form a second seal portion which extends in a second direction which is parallel to the path of movement of the first and second enclosure sheets during a second period of time, wherein (i) the first edge roller is held stationary during the first period of time, and (ii) the center roller is held stationary during the second period of time.

8. The method of claim 7, wherein the center roller and the first edge roller are rotatably supported on a common axis.

9. The method of claim 7, wherein the center roller rotates independently of the first edge roller.

10. The method of claim 7, further comprising the steps of:

providing a second edge roller, wherein (1) the center roller, the first edge roller, and the second edge roller are rotatably supported on a common axis, (2) both of the first edge roller and the second edge roller rotate independently of the center edge roller; and urging the first pressure sensitive adhesive toward the second pressure sensitive adhesive with the second end roller so as to form a third seal portion which extends in the second direction which is parallel to the path of movement of the first and second enclosure sheets.

11. A sealing assembly, comprising:

a support surface;

a center sealer which operatively contacts said support surface so as to urge a first enclosure sheet into contact with a second enclosure sheet; and an edge sealer which operatively contacts said support surface so as to urge said first enclosure sheet into contact with said second enclosure sheet, wherein (1) said center sealer and said edge sealer are rotatable supported on a common axis, and (2) said center sealer rotates independently of said edge sealer, wherein said edge sealer includes a first edge roller, wherein said center sealer and said first edge roller are rotatably supported on said common axis, wherein said center sealer rotates independently of said first edge roller, and wherein said first edge roller is held stationary during rotation of said center sealer.

12. The assembly of claim 11, wherein:

said edge sealer further includes a second edge roller, said center sealer, said first edge roller, and said second edge roller are rotatably supported on said common axis, said first edge roller rotates dependently of said second edge roller, and said second edge roller is held stationary during rotation of said center roller.

13. A sealing assembly, comprising:

a support surface;

a center sealer which operatively contacts said support surface so as to urge a first enclosure sheet into contact with a second enclosure sheet;

an edge sealer which operatively contacts said support surface so as to urge said first enclosure sheet into contact with said second enclosure sheet, wherein (1) said center sealer and said edge sealer are rotatable supported on a common axis, and (2) said center sealer rotates independently of said edge sealer; and a first drive motor having a first output shaft which is mechanically coupled to said edge sealer.

14. The assembly of claim 13, wherein (1) said support surface includes a support roller, and (2) said first output shaft of said first drive motor is further mechanically coupled to said support roller, further comprising:

a support roller gear which is non-rotatably secured to said support roller; and an edge sealer gear which is non-rotatably secured to said edge sealer, wherein said edge sealer gear meshingly engages said support roller gear.

15. The assembly of claim 14, further comprising a second drive motor having a second output shaft which is mechanically coupled to said center sealer.

16. The assembly of claim 15, wherein said center sealer further rotates independently of said support roller.

17. The assembly of claim 11, wherein:

said first enclosure sheet includes a first pressure sensitive adhesive thereon, said second enclosure sheet includes a second pressure sensitive adhesive thereon, said center sealer urges said first pressure sensitive adhesive toward said second pressure sensitive adhesive so as to form a first seal portion which extends in a first direction which is perpendicular to a path of movement of said first and second enclosure sheets, and said edge sealer urges said first pressure sensitive adhesive toward said second pressure sensitive adhesive so as to form a second seal portion which extends in a second direction which is parallel to said path of movement of said first and second enclosure sheets.

18. The assembly of claim 1, wherein said center roller is held stationary during rotation of said first edge roller and said second edge roller.

* * * * *